United States Patent
Swing et al.

(10) Patent No.: US 8,250,271 B2
(45) Date of Patent: Aug. 21, 2012

(54) COMMAND AND INTERRUPT GROUPING FOR A DATA STORAGE DEVICE

(75) Inventors: Andrew T. Swing, Los Gatos, CA (US); Albert T. Borchers, Santa Cruz, CA (US); Grant Grundler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 12/537,727

(22) Filed: Aug. 7, 2009

(65) Prior Publication Data

US 2010/0262738 A1 Oct. 14, 2010

Related U.S. Application Data

(60) Provisional application No. 61/167,709, filed on Apr. 8, 2009, provisional application No. 61/187,835, filed on Jun. 17, 2009.

(51) Int. Cl.
*G06F 13/24* (2006.01)

(52) U.S. Cl. ......... 710/260; 710/240; 710/200; 711/154

(58) Field of Classification Search .......... 710/260–269, 710/240–244, 22, 200; 711/106, 154

See application file for complete search history.

(56) References Cited

U.S. PATENT DOCUMENTS

| | | | |
|---|---|---|---|
| 4,449,182 A | 5/1984 | Rubinson et al. | |
| 4,777,595 A | 10/1988 | Strecker et al. | |
| 5,619,687 A | 4/1997 | Langan et al. | |
| 5,708,814 A | 1/1998 | Short et al. | |
| 5,802,345 A * | 9/1998 | Matsunami et al. | ............ 703/27 |
| 5,844,776 A | 12/1998 | Yamaguchi et al. | |
| 5,941,998 A | 8/1999 | Tillson | |
| 6,003,112 A | 12/1999 | Tetrick | |
| 6,009,478 A | 12/1999 | Panner et al. | |
| 6,167,338 A | 12/2000 | De Wille et al. | |
| 6,343,660 B1 | 2/2002 | Mutsaers | |
| 6,640,290 B1 | 10/2003 | Forin et al. | |
| 6,678,463 B1 | 1/2004 | Pierre et al. | |

(Continued)

FOREIGN PATENT DOCUMENTS

EP 1736885 A2 12/2006

(Continued)

OTHER PUBLICATIONS

International Search Report and Written Opinion received for PCT Application No. PCT/US2010/029677, mailed on Jul. 5, 2010, 13 pages.

(Continued)

*Primary Examiner* — Brian Misiura
*Assistant Examiner* — Kim Huynh
(74) *Attorney, Agent, or Firm* — Brake Hughes Bellermann LLP

(57) ABSTRACT

A data storage device may include multiple memory chips and a controller that is operably coupled to the memory chips and that is arranged and configured to receive a group of commands from a host, where each of the commands in the group includes a same group number to identify the commands as part of the group, process the group of the commands using the memory chips and generate and send a single interrupt to the host when the group of the commands completes processing.

30 Claims, 7 Drawing Sheets

U.S. PATENT DOCUMENTS

| | | |
|---|---|---|
| 6,697,284 B2 | 2/2004 | Marotta |
| 6,757,797 B1 | 6/2004 | Kaiya et al. |
| 6,854,022 B1 | 2/2005 | Thelin |
| 6,868,007 B2 | 3/2005 | Hasegawa et al. |
| 6,938,188 B1 | 8/2005 | Kelleher |
| 6,982,919 B2 | 1/2006 | Kumahara et al. |
| 7,000,245 B1 | 2/2006 | Pierre et al. |
| 7,012,632 B2 | 3/2006 | Freeman et al. |
| 7,028,137 B2 | 4/2006 | Nashimoto et al. |
| 7,080,245 B2 | 7/2006 | Ballard et al. |
| 7,080,377 B2 | 7/2006 | Peled et al. |
| 7,088,387 B1 | 8/2006 | Freeman et al. |
| 7,114,051 B2 | 9/2006 | Guu et al. |
| 7,127,549 B2 | 10/2006 | Sinclair |
| 7,127,551 B2 | 10/2006 | Beck |
| 7,158,167 B1 | 1/2007 | Yerazunis et al. |
| 7,159,104 B2 | 1/2007 | Dewey |
| 7,161,834 B2 | 1/2007 | Kumahara et al. |
| 7,225,289 B2 | 5/2007 | Tee et al. |
| 7,296,213 B2 | 11/2007 | Vainsencher et al. |
| 7,310,699 B2 | 12/2007 | Sinclair |
| 7,328,304 B2 * | 2/2008 | Royer et al. ............ 711/113 |
| 7,356,637 B2 | 4/2008 | Tee et al. |
| 7,370,230 B1 | 5/2008 | Flake |
| 7,392,367 B2 * | 6/2008 | Clark et al. ............ 712/216 |
| 7,406,572 B1 | 7/2008 | Nguyen |
| 7,546,393 B2 * | 6/2009 | Day et al. ............ 710/22 |
| 7,562,366 B2 | 7/2009 | Pope et al. |
| 7,631,084 B2 | 12/2009 | Thomas et al. |
| 7,660,306 B1 | 2/2010 | Eriksson et al. |
| 7,668,177 B1 | 2/2010 | Trapp et al. |
| 7,730,257 B2 | 6/2010 | Franklin |
| 7,836,378 B2 | 11/2010 | Shaeffer et al. |
| 7,865,809 B1 | 1/2011 | Lee et al. |
| 7,904,639 B2 | 3/2011 | Kim et al. |
| 8,037,234 B2 | 10/2011 | Yu et al. |
| 8,051,253 B2 | 11/2011 | Okin et al. |
| 8,086,936 B2 | 12/2011 | Gower et al. |
| 2001/0023472 A1 | 9/2001 | Kubushiro et al. |
| 2002/0005895 A1 | 1/2002 | Freeman et al. |
| 2002/0053004 A1 | 5/2002 | Pong |
| 2002/0078285 A1 * | 6/2002 | Hofstee et al. ............ 710/260 |
| 2002/0178307 A1 | 11/2002 | Pua et al. |
| 2003/0058689 A1 | 3/2003 | Marotta |
| 2003/0101327 A1 | 5/2003 | Beck |
| 2003/0117846 A1 | 6/2003 | Hasegawa et al. |
| 2003/0208771 A1 | 11/2003 | Hensgen et al. |
| 2003/0221092 A1 | 11/2003 | Ballard et al. |
| 2003/0225960 A1 | 12/2003 | Guu et al. |
| 2004/0049649 A1 | 3/2004 | Durrant |
| 2004/0078729 A1 | 4/2004 | Peter |
| 2004/0236933 A1 | 11/2004 | Dewey |
| 2005/0041509 A1 | 2/2005 | Kumahara et al. |
| 2005/0160218 A1 | 7/2005 | See et al. |
| 2005/0172067 A1 | 8/2005 | Sinclair |
| 2005/0172087 A1 | 8/2005 | Klingman |
| 2005/0177698 A1 | 8/2005 | Ku et al. |
| 2005/0193164 A1 | 9/2005 | Royer et al. |
| 2006/0053308 A1 | 3/2006 | Zimmerman |
| 2006/0062052 A1 | 3/2006 | Kumahara et al. |
| 2006/0123284 A1 | 6/2006 | Hwang et al. |
| 2006/0206653 A1 | 9/2006 | Tee et al. |
| 2007/0008801 A1 | 1/2007 | Chiang et al. |
| 2007/0028040 A1 | 2/2007 | Sinclair |
| 2007/0101238 A1 | 5/2007 | Resnick et al. |
| 2007/0113150 A1 | 5/2007 | Resnick et al. |
| 2007/0198796 A1 | 8/2007 | Warren |
| 2007/0208900 A1 | 9/2007 | Tee et al. |
| 2007/0255890 A1 | 11/2007 | Urata et al. |
| 2007/0255981 A1 | 11/2007 | Eto et al. |
| 2007/0288686 A1 | 12/2007 | Arcedera et al. |
| 2007/0288692 A1 | 12/2007 | Bruce et al. |
| 2008/0010431 A1 | 1/2008 | Chang et al. |
| 2008/0022186 A1 | 1/2008 | Co et al. |
| 2008/0040531 A1 | 2/2008 | Anderson |
| 2008/0052448 A1 | 2/2008 | Minz et al. |
| 2008/0052449 A1 | 2/2008 | Kim et al. |
| 2008/0052451 A1 | 2/2008 | Pua et al. |
| 2008/0059747 A1 | 3/2008 | Burckart et al. |
| 2008/0065815 A1 | 3/2008 | Nasu et al. |
| 2008/0077727 A1 | 3/2008 | Baca et al. |
| 2008/0126658 A1 | 5/2008 | Wang |
| 2008/0147931 A1 | 6/2008 | McDaniel et al. |
| 2008/0155160 A1 | 6/2008 | McDaniel |
| 2008/0163030 A1 | 7/2008 | Lee |
| 2008/0178025 A1 | 7/2008 | Hand et al. |
| 2008/0209157 A1 | 8/2008 | Weng |
| 2008/0222491 A1 | 9/2008 | Lee et al. |
| 2008/0235467 A1 | 9/2008 | Tagawa |
| 2008/0288814 A1 | 11/2008 | Kitahara |
| 2008/0294814 A1 | 11/2008 | Gorobets |
| 2008/0301349 A1 * | 12/2008 | Bacha ............ 710/306 |
| 2008/0301381 A1 * | 12/2008 | Lee et al. ............ 711/154 |
| 2008/0320214 A1 | 12/2008 | Ma et al. |
| 2009/0006720 A1 | 1/2009 | Traister |
| 2009/0037652 A1 | 2/2009 | Yu et al. |
| 2009/0044078 A1 | 2/2009 | Vogan et al. |
| 2009/0055590 A1 | 2/2009 | Takahashi et al. |
| 2009/0063895 A1 | 3/2009 | Smith |
| 2009/0063922 A1 | 3/2009 | Gower et al. |
| 2009/0063934 A1 | 3/2009 | Jo |
| 2009/0119443 A1 | 5/2009 | Tremaine |
| 2009/0125785 A1 | 5/2009 | Gorobets et al. |
| 2009/0125791 A1 | 5/2009 | Iyer et al. |
| 2009/0240873 A1 | 9/2009 | Yu et al. |
| 2009/0265513 A1 | 10/2009 | Ryu |
| 2010/0049914 A1 | 2/2010 | Goodwin |
| 2010/0153660 A1 | 6/2010 | Lasser |
| 2010/0211737 A1 | 8/2010 | Flynn et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0269015 A1 | 10/2010 | Borchers et al. |
| 2010/0287217 A1 | 11/2010 | Borchers et al. |
| 2011/0191554 A1 | 8/2011 | Sakai |
| 2011/0213921 A1 | 9/2011 | Yu et al. |
| 2011/0238885 A1 | 9/2011 | Kitahara et al. |
| 2012/0030416 A1 | 2/2012 | Borchers et al. |
| 2012/0030507 A1 | 2/2012 | Borchers et al. |
| 2012/0030542 A1 | 2/2012 | Borchers et al. |

FOREIGN PATENT DOCUMENTS

| | | |
|---|---|---|
| JP | 2004-071033 | 3/2004 |
| WO | 01/33852 A1 | 5/2001 |
| WO | 01/90900 A1 | 11/2001 |
| WO | 02/03388 A2 | 1/2002 |
| WO | 02/11424 A2 | 2/2002 |
| WO | 02/058383 A1 | 7/2002 |
| WO | 2005/081097 A2 | 9/2005 |
| WO | 2005/093588 A2 | 10/2005 |
| WO | 2005/081097 A3 | 11/2005 |
| WO | 2005/093588 A3 | 12/2006 |
| WO | 2007/072313 A2 | 6/2007 |
| WO | 2007/072317 A2 | 6/2007 |
| WO | 2007/072317 A3 | 6/2007 |
| WO | 2007/096844 A2 | 8/2007 |
| WO | 2007/096844 A3 | 8/2007 |
| WO | 2007/146756 A2 | 12/2007 |
| WO | 2007/146845 A2 | 12/2007 |
| WO | 2008/022094 A2 | 2/2008 |
| WO | 2008/040028 A2 | 4/2008 |
| WO | 2008/025238 A1 | 6/2008 |
| WO | 2008/147752 A1 | 12/2008 |
| WO | 2010/117877 A1 | 10/2010 |
| WO | 2010/117878 A1 | 10/2010 |

OTHER PUBLICATIONS

International Search Report and Written Opinion received for PCT Application No. PCT/US2010/029679, mailed on Jul. 5, 2010, 20 pages.
International Search Report and Written Opinion received for PCT Application No. PCT/US2010/029916, mailed on Jul. 7, 2010, 14 pages.
International Search Report and Written Opinion received for PCT Application No. PCT/US2010/029917, mailed on Jul. 28, 2010, 19 pages.
International Search Report and Written Opinion received for PCT Application No. PCT/US2010/029919, mailed on Jul. 28, 2010, 11 pages.
International Search Report and Written Opinion received for PCT Application No. PCT/US2010/030389, mailed on Jul. 21, 2010, 11 pages.
U.S. Appl. No. 12/537,733, filed Aug. 7, 2009.
U.S. Appl. No. 12/537,727, filed Aug. 7, 2009.
U.S. Appl. No. 12/537,725, filed Aug. 7, 2009.
U.S. Appl. No. 12/537,722, filed Aug. 7, 2009.
U.S. Appl. No. 12/537,719, filed Aug. 7, 2009.
U.S. Appl. No. 12/756,009, filed Apr. 7, 2010, 35 pages.
U.S. Appl. No. 12/537,709, filed Aug. 7, 2009.
U.S. Appl. No. 12/755,968, filed Apr. 7, 2010, 41 pages.
U.S. Appl. No. 12/537,748, filed Aug. 7, 2009.
U.S. Appl. No. 12/756,007, filed Apr. 7. 2010, 54 pages.
U.S. Appl. No. 12/756,477, filed Apr. 8, 2010, 51 pages.
U.S. Appl. No. 12/537,738, filed Aug. 7, 2009.
U.S. Appl. No. 12/755,964, filed Apr. 7, 2010, 44 pages.
Non-Final Office Action for U.S. Appl. No. 12/755,968, mailed Jan. 26, 2012, 32 pages.
Non-Final Office Action for U.S. Appl. No. 13/269,985, mailed Jan. 6, 2012, 24 pages.
Non-Final Office Action for U.S. Appl. No. 12/537,709, mailed Dec. 19, 2011, 28 pages.
Non-Final Office Action for U.S. Appl. No. 12/537,719, mailed Nov. 30, 2011, 29 pages.
Non-Final Office Action for U.S. Appl. No. 12/537,722, mailed Dec. 29, 2011, 25 pages.
Non-Final Office Action for U.S. Appl. No. 12/537,704, mailed Nov. 28, 2011, 24 pages.
Non-Final Office Action for U.S. Appl. No. 12/537,748, mailed Dec. 12, 2011, 24 pages.
Non-Final Office Action for U.S. Appl. No. 12/537,741, mailed Dec. 21, 2011, 25 pages.
Non-Final Office Action for U.S. Appl. No. 12/537,738, mailed Dec. 12, 2011, 25 pages.
Non-Final Office Action for U.S. Appl. No. 13/269,183, mailed Dec. 27, 2011, 27 pages.
Non-Final Office Action for U.S. Appl. No. 13/269,972, mailed Jan. 5, 2012, 26 pages.
Non-Final Office Action for U.S. Appl. No. 12/537,725, mailed Jan. 30, 2012, 33 pages.
Wen, et al, "A Processor-DMA-Based Memory Copy Hardware Accelerator", 6th IEEE International Conference on Networking, Architecture and Storage (NAS), Jul. 30, 2011, pp. 225-229.
Paris, et al, "Evaluating the Impact of Irrecoverable Read Errors on Disk Array Reliability", 15th IEEE Pacific Rim International Symposium on Dependable Computing, Nov. 16-18, 2009, 6 pages.
Takeuchi, "Novel Co-Design of NAND Flash Memory and NAND Flash Controller Circuits for Sub-30 nm Low-Power High-Speed Solid-State Drives (SSD)", IEEE Journal of Solid-State Circuits, vol. 44, No. 4, Apr. 2009, pp. 1227-1234.
Notice of Allowance for U.S. Appl. No. 12/537,722, mailed May 11, 2012, 14 pages.
Notice of Allowance for U.S. Appl. No. 13/269,972, mailed May 23, 2012, 18 pages.
Non-Final Office Action for U.S. Appl. No. 13/269,985, mailed Jun. 6, 2012, 19 pages.
Non-Final Office Action Response for U.S. Appl. No. 12/537,722, filed Apr. 19, 2012, 12 pages.
Non-Final Office Action Response for U.S. Appl. No. 12/537,725, filed Apr. 27, 2012, 12 pages.
Non-Final Office Action Response for U.S. Appl. No. 12/537,748, filed May 2, 2012, 13 pages.
Notice of Allowance for U.S. Appl. No. 12/537,725, mailed May 21, 2012, 18 pages.
Final Office Action for U.S. Appl. No. 12/537,704, mailed Apr. 6, 2012, 15 pages.
Notice of Allowance for U.S. Appl. No. 12/537,709, mailed Apr. 6, 2012, 14 pages.
Non-Final Office Action Response for U.S. Appl. No. 12/537,709, filed Mar. 19, 2012, 15 pages.
Final Office Action for U.S. Appl. No. 12/537,719, mailed Apr. 9, 2012, 21 pages.
Non-Final Office Action for U.S. Appl. No. 12/537,733, mailed Mar. 14, 2012, 23 pages.
Non-Final Office Action Response for U.S. Appl. No. 13/269,183, filed Mar. 27, 2012, 17 pages.
Notice of Allowance for U.S. Appl. No. 13/269,183, mailed Apr. 19, 2012, 15 pages.
Non-Final Office Action Response for U.S. Appl. No. 13/269,972, filed Apr. 4, 2012, 12 pages.
Non-Final Office Action Response for U.S. Appl. No. 13/269,985, filed Apr. 4, 2012, 15 pages.

* cited by examiner

COMMAND AND INTERRUPT GROUPING FOR A DATA STORAGE DEVICE

CROSS REFERENCE TO RELATED APPLICATIONS

This application claims the benefit of U.S. Provisional Application No. 61/167,709, filed Apr. 8, 2009, and titled "Data Storage Device" and U.S. Provisional Application No. 61/187,835, filed Jun. 17, 2009, and titled "Partitioning and Striping in a Flash Memory Data Storage Device," both of which are hereby incorporated by reference in entirety.

TECHNICAL FIELD

This description relates to command and interrupt grouping for a data storage device.

BACKGROUND

Data storage devices may be used to store data. A data storage device may be used with a computing device to provide for the data storage needs of the computing device. In certain instances, it may be desirable to store large amounts of data on a data storage device. Also, it may be desirable to execute commands quickly to read data and to write data to the data storage device.

The throughput of the command execution on the data storage device may be related to the number of commands that may be processed by the data storage device. It may be desirable to achieve a high throughput for the data storage device by increasing the number of commands that may be processed by the data storage device. In addition to executing the commands quickly, it may be desirable to execute the commands accurately, such that data errors are minimized and/or the data errors are correctible with at least a minimal impact on data throughput.

Furthermore, it may be desirable to execute commands received from a host on the data storage device while minimizing the impact and overhead on the host.

SUMMARY

This document describes a host having a driver that designates commands as part of a group for processing by a data storage device. When the data storage device completes the processing of all of the commands in the group, the data storage device sends a single interrupt back to the host to indicate that the processing of the group of commands is complete. For example, one or more threads of commands may be designated as a group by the driver. When the data storage device completes the thread or threads of commands, the data storage device generates and sends a single interrupt to the host to indicate that the processing of those grouped commands is complete.

By designating the commands as part of a group and sending a single interrupt to the host when the processing of the commands is complete, the impact on the host may be minimized. In this manner, the host may spend less time processing interrupts and may devote more time performing other tasks. Moreover, in some instances, the host may not be able to use any of the data until all of the commands in the group have been processed. In those instances, it may not be useful for the host be notified when less than all of the commands in the group have been processed.

In one exemplary implementation, the driver at the host may determine how to group the commands. The driver may group the commands based on certain criteria. For example, the driver may group the commands based on the size of a desired action from an application that interfaces with the driver. In this manner, the driver may group commands together that are a part of a large input/output request from an interfacing application. Thus, even as an operating system may break the large input/output request into multiple commands to perform the request, the driver groups the commands together. In another example, the driver may group the commands based on the commands being part of the same thread or threads.

The data storage device may include multiple memory devices and a controller. The controller may be configured to receive commands from the host and to process the commands using the multiple memory devices. When the controller receives commands from the host that are identified as part of a group, then the controller may process those commands using the memory devices and generate and send a single interrupt back to the host only when all of the commands in the group have been processed. In this manner, an interrupt is not generated for each command in the group or subset of commands in the group. Instead, a single interrupt is generated for the entire group of commands.

The controller may include an interrupt processor that is arranged and configured to track grouped commands. The interrupt processor may be configured to track multiple groups of commands as the commands from the multiple groups are being processed by the controller using the memory devices. In one exemplary implementation, the commands include a command header and a group number is inserted into the command header by the driver so that the command may be tracked by the interrupt processor. The command header also includes a flag, which may be set by the driver to indicate that a command is the last command in the group. The interrupt processor may be configured to recognize the last command flag, which may act as an indicator to generate the single interrupt when the commands have completed processing.

In one exemplary implementation, the controller may include a command processor for tracking, ordering, queuing and processing commands from a host for execution on a data storage device. The command processor may be arranged and configured to track incoming commands from the host by assigning a global slot identifier to each of the commands and to queue and order the commands using an ordered list that is based on the age of the commands. The command processor may be configured to maintain the order of the commands as received from the host for commands that are designated for a same storage location. The command processor also may be configured to take the commands out of order for commands that are designated for different storage locations. In this manner, the order of the commands is maintained where it is important to maintain the order, as received from the host. At the same time, the command processor keeps all of the storage locations substantially busy by taking commands out of order for commands that are designated for different storage locations. The command processor enables parallel processing of commands by substantially all of the storage locations having designated commands in the command queue.

While the command processor tracks all of the individual commands as they are being processed, the interrupt processor may track commands which are part of a group of commands. In this manner, the controller may process commands in a non-contiguous manner, including commands that are a part of a group of commands. The interrupt processor will wait until all of the commands in a group are processed before generating and sending the single interrupt to the host. The enables the command processor to continue parallel processing of commands and, at the same time, reduces the overhead and time spent by the host on processing unnecessary interrupts which may otherwise have been sent from the data storage device.

In one exemplary implementation, the data storage device may include multiple channel controllers that are arranged and configured to control operations associated with one or more memory chips. The memory chips may include flash memory chips.

In one exemplary implementation, the command processor, the interrupt processor and the channel controllers may be implemented as part of a field programmable gate array (FPGA) controller, where the FPGA controller may be a part of a data storage device.

The data storage device may include one or more memory boards, where each of the memory boards includes multiple memory devices. In one exemplary implementation, each of the memory boards may include multiple flash memory chips. The memory boards may include multiple channels, where one or more of the flash memory chips may be assigned to each of the channels. The data storage device may include a controller board to which the memory boards operably connect. The data storage device may be configured to communicate with a host using an interface to receive commands from the host and to process those commands using the flash memory chips. For example, the host may send and the controller board may receive commands to read, write, copy and erase blocks of data using the flash memory chips.

In one exemplary implementation, the controller includes a field-programmable gate array (FPGA) controller and the interface between the host and the controller board may be a high speed interface such as, for example, a peripheral component interconnect express (PCIe) interface. In this manner, the data storage device may include high storage volumes and may be configured to achieve high performance and high speeds of data transfer between the host and the flash memory chips.

In one exemplary implementation, the data storage device may be configured with two memory boards with each of the memory boards including multiple flash memory chips. The data storage device, including the controller board and two memory boards, may be configured in a disk drive form such that the data storage device fits in an on-board drive slot of a computing device. For instance, the data storage device may be configured to fit in an on-board drive slot of a server to provide data storage capacity for the server. The data storage device may be configured to be removable such that it may be removed easily from the computing device and inserted in the on-board drive slot of a different computing device.

In other exemplary implementations, each of the memory boards may include memory devices other than flash memory chips. For example, each of the memory boards may include multiple dynamic random access memory (DRAM) chips. In the same manner as described above with respect to the flash memory chips, the command processor and interrupt processor may be configured to process commands received from the host as a group and to generate and send a single interrupt back to the host when the commands have been processed using the DRAM chips. In other exemplary implementations, the memory boards may include other types of memory devices including, for example, phase change memory (PCM) chips and other types of memory devices.

According to one general aspect, a data storage device may include multiple memory chips and a controller that is operably coupled to the memory chips and that is arranged and configured to receive a group of commands from a host, where each of the commands in the group includes a same group number to identify the commands as part of the group, process the group of the commands using the memory chips and generate and send a single interrupt to the host when the group of the commands completes processing.

Implementations may include one or more of the following features. For example, the controller may be configured to receive multiple groups of commands from the host, wherein each of the commands includes a group number to identify the commands as part of one of the groups, process the groups of the commands using the memory chips and generate and send a single interrupt to the host for each of the groups as each of the groups of the commands completes processing. The controller may be configured to process the groups of the commands in a non-contiguous order using the memory chips.

Each of the commands may include a command header and the command header includes the group number. A last command in the group of the commands may include a flag in a command header to indicate the last command to the controller. The group number may identify each of the commands as part of the group without using pointers in the commands to point to a next command in the group.

The controller may include an interrupt processor that is arranged and configured to track the group of the commands as the commands are processed by the controller and to generate the single interrupt to send to the host when the group of the commands is completed processing. The interrupt processor may include multiple counters, wherein each of the counters is assigned to a different group of commands received by the controller. The interrupt processor may include multiple different interrupt mechanisms. More than one interrupt mechanism may be enabled at a same time. The interrupt mechanisms may include a watermark interrupt mechanism, a timeout interrupt mechanism and a group interrupt mechanism.

In one exemplary implementation, the memory chips may be flash memory chips and the controller may be a field programmable gate array (FPGA) controller. The data storage device may include a memory board on which the flash memory chips may be arranged and configured into multiple channels, with each of the channels being associated with one or more of the flash memory chips and a controller board that is operably connected to the memory board. The controller board may include a high speed interface and the controller that may be arranged and configured to receive the commands from the host using the high speed interface.

In another general aspect, a method for processing a group of commands on a data storage device having multiple memory chips may include receiving a group of commands from a host, where each of the commands in the group includes a same group number to identify the commands as part of the group, processing the group of commands using multiple memory chips and generating and sending a single interrupt to the host when the group of the commands completes processing.

Implementations may include one or more of the following features. For example, receiving the group of the commands from the host may include receiving multiple groups of commands from the host, where each of the commands includes a group number to identify the commands as part of one of the groups, processing the group of the commands may include processing the groups of the commands using the memory chips and generating and sending the single interrupt may include generating and sending a single interrupt to the host for each of the groups as each of the groups completes processing. Processing the groups of the commands may include processing the groups of the commands in a non-contiguous order using the memory chips.

In another general aspect, an apparatus for tracking commands in a controller may include multiple group counters, where each of the group counters is configured to track a group of commands being processed by a controller by incrementing when a command in the group begins processing by the controller and decrementing when a command in the group completes processing and interrupt send logic that is operably coupled to the group counters and that is arranged and configured to generate and send a single interrupt for each of the group counters when all of the commands in a group complete processing.

Implementations may include one or more of the following features. For example, each of the commands in a same group may be identified by a same group number. The multiple group counters may be configured to receive a signal to increment one of the group counters when a command being tracked by the group counter begins processing. The multiple group counters may be configured to receive a signal to decrement one of the group counters when a command being tracked by the group counter completes processing. The interrupt send logic may be configured to generate and send the single interrupt when a last command in a group begins processing and the group counter associated with the final command is decremented to zero.

In another general aspect, a method for tracking commands in a controller may include incrementing a group counter when a command in a group of commands begins processing, decrementing the group counter when a command in the group of commands completes processing and generating and sending a single interrupt for the group of commands when all of the commands in the group complete processing.

Implementations may include one or more of the following features. For example, generating and sending the single interrupt may include generating and sending the single interrupt when a last command in the group begins processing and the group counter is decremented to zero.

In another general aspect, a system may include a data storage device including a plurality of memory chips and multiple physical channels for communication of data between a host and the plurality of memory chips, each channel being operably connected to a different plurality of the memory chips and a host operably coupled to the data storage device using an interface. The host may include a driver that is configured to send commands to the data storage device for processing by the data storage device using the plurality of memory chips, group the commands into one or more different groups and to assign a group number to each of the commands in a group and mark a last command in a group.

Implementations may include one or more of the following features. For example, the data storage device may be configured to generate and send a single interrupt to the host after processing the commands in the group. The plurality of memory chips may include flash memory chips. The driver may be configured to track usage of group numbers. The data storage device may be configured to process groups of the commands in non-contiguous order using the plurality of memory chips.

The host may be configured to enable one or more interrupt mechanisms on the data storage device. The interrupt mechanisms may include a watermark interrupt mechanism, a timeout interrupt mechanism and a group interrupt mechanism.

The details of one or more implementations are set forth in the accompanying drawings and the description below. Other features will be apparent from the description and drawings, and from the claims.

DETAILED DESCRIPTION

This document describes an apparatus, system(s) and techniques for grouping commands at a host and processing the commands in a data storage device. The host may determine which commands to group together and may provide an indication of which commands are in a same group. For example, the host may assign and insert a group number into the command header of each command that is part of a group. The data storage device may include a controller having an interrupt processor that is configured to track the processing of the commands, which have been grouped together by the host. When the data storage device completes the processing of all of the commands in the group, the interrupt processor generates and sends a single interrupt back to the host to indicate that the processing of the group of commands is complete.

Figure 1:
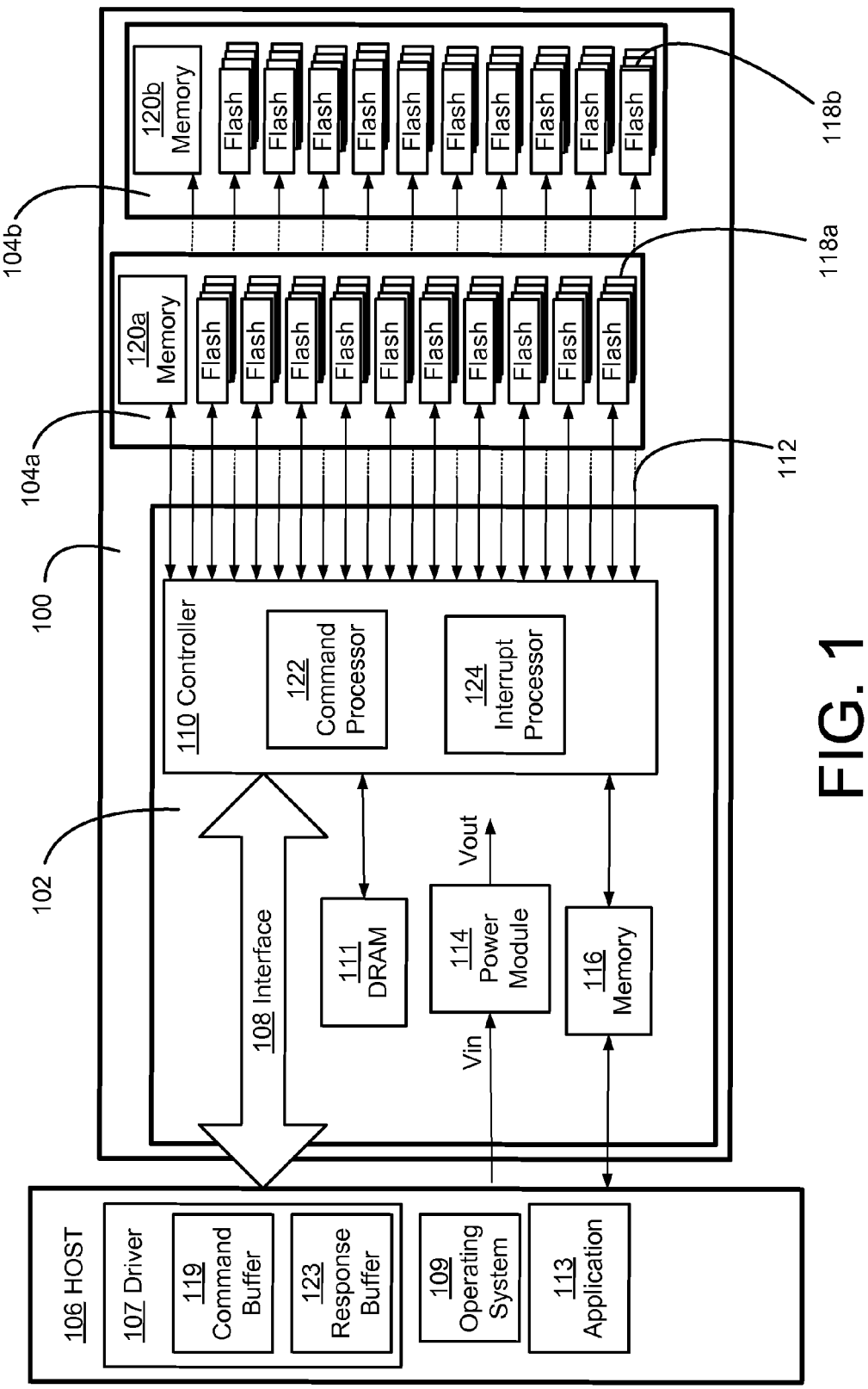
FIG. 1 is an exemplary block diagram of a host and a data storage device.

Referring to FIG. 1, a block diagram of a system for processing and tracking commands in a group is illustrated. FIG. 1 illustrates a block diagram of a data storage device 100 and a host 106. The data storage device 100 may include a controller board 102 and one or more memory boards 104a and 104b. The data storage device 100 may communicate with the host 106 over an interface 108. The interface 108 may be between the host 106 and the controller board 102.

The controller board 102 may include a controller 110, a DRAM 111, multiple channels 112, a power module 114, and a memory module 116. The controller 110 may include a command processor 122 and an interrupt processor 124, as well as other components, which are not shown. The memory boards 104a and 104b may include multiple flash memory chips 118a and 118b on each of the memory boards. The memory boards 104a and 104b also may include a memory device 120a and 120b, respectively.

The host 106 may include a driver 107, an operating system 109 and one or more applications 113. In general, the host 106 may generate commands to be executed on the data storage device 100. For example, the application 113 may be configured to generate commands for execution on the data storage device 100. The application 113 may be operably coupled to the operating system 109 and/or to the driver 107. The application 113 may generate the commands and communicate the commands to the operating system 109. The operating system 109 may be operably coupled to the driver 107, where the driver 107 may act as an interface between the host 106 and the data storage device 100.

In general, the data storage device 100 may be configured to store data on the flash memory chips 118a and 118b. The host 106 may write data to and read data from the flash memory chips 118a and 118b, as well as cause other operations to be performed with respect to the flash memory chips 118a and 118b. The reading and writing of data between the host 106 and the flash memory chips 118a and 118b, as well as the other operations, may be processed through and controlled by the controller 110 on the controller board 102. The controller 110 may receive commands from the host 106 and cause those commands to be executed using the command processor 122 and the flash memory chips 118a and 118b on the memory boards 104a and 104b. The communication between the host 106 and the controller 110 may be through the interface 108. The controller 110 may communicate with the flash memory chips 118a and 118b using the channels 112.

The controller board 102 may include DRAM 111. The DRAM 111 may be operably coupled to the controller 110 and may be used to store information. For example, the DRAM 111 may be used to store logical address to physical address maps and bad block information. The DRAM 111 also may be configured to function as a buffer between the host 106 and the flash memory chips 118a and 118b.

In one exemplary implementation, the controller board 102 and each of the memory boards 104a and 104b are physically separate printed circuit boards (PCBs). The memory board 104a may be on one PCB that is operably connected to the controller board 102 PCB. For example, the memory board 104a may be physically and/or electrically connected to the controller board 102. Similarly, the memory board 104b may be a separate PCB from the memory board 104a and may be operably connected to the controller board 102 PCB. For example, the memory board 104b may be physically and/or electrically connected to the controller board 102. The memory boards 104a and 104b each may be separately disconnected and removable from the controller board 102. For example, the memory board 104a may be disconnected from the controller board 102 and replaced with another memory board (not shown), where the other memory board is operably connected to controller board 102. In this example, either or both of the memory boards 104a and 104b may be swapped out with other memory boards such that the other memory boards may operate with the same controller board 102 and controller 110.

In one exemplary implementation, the controller board 102 and each of the memory boards 104a and 104b may be physically connected in a disk drive form factor. The disk drive form factor may include different sizes such as, for example, a 3.5" disk drive form factor and a 2.5" disk drive form factor.

In one exemplary implementation, the controller board 102 and each of the memory boards 104a and 104b may be electrically connected using a high density ball grid array (BGA) connector. Other variants of BGA connectors may be used including, for example, a fine ball grid array (FBGA) connector, an ultra fine ball grid array (UBGA) connector and a micro ball grid array (MBGA) connector. Other types of electrical connection means also may be used.

In one exemplary implementation, the memory chips 118a-118n may include flash memory chips. In another exemplary implementation, the memory chips 118a-118n may include DRAM chips or combinations of flash memory chips and DRAM chips. The memory chips 118a-118n may include other types of memory chips as well.

In one exemplary implementation, the host 106 using the driver 107 and the data storage device 100 may communicate commands and responses using pairs of buffers in host memory. The terms "buffer" and "queue" are used interchangeably throughout this document. For example, a command buffer 119 may be used for commands and a response buffer 123 may be used for responses or results to the commands. In one exemplary implementation, the commands and results may be relatively small, fixed size blocks. For instance, the commands may be 32 bytes and the results or responses may be 8 bytes. In other exemplary implementations, other sized blocks may be used including variable size blocks. Tags may be used to match the results to the commands. In this manner, the data storage device 100 may complete commands out of order.

Although FIG. 1 illustrates one command buffer 119 and one response buffer 123, multiple pairs of buffers may be used. For example, up to and including 32 buffer pairs may be used. In one exemplary implementation, the data storage device 100 may service the command buffer 119 in a round robin fashion, where the data storage device 100 may retrieve a fixed number of commands at a time from the command buffer 119. The response buffer 123 may include its own interrupt and interrupt parameters.

In one exemplary implementation, each command may refer to one memory page (e.g., one flash page), one erase block or one memory chip depending on the command. Each command that transfers data may include one 4K direct memory access (DMA) buffer. Larger operations may be implemented by sending multiple commands. The driver 107 may be arranged and configured group together a single operation of multiple commands such that the data storage device 100 processes the commands using the flash memory chips 118a and 118b and generate and send a single interrupt back to the host 106 when the multiple grouped commands have been processed.

In one exemplary implementation, the command buffer 119 and the response buffer 123 each include a head pointer and a tail pointer. Commands and responses may be inserted at the tail pointer and removed at the head pointer. The host 106 may be the producer of the command buffer 119 and the consumer of the response buffer 123. The data storage device 100 may be the consumer of the command buffer 119 and the producer of the response buffer 123. The host 106 may write the command tail pointer and the response head pointer and may read the command head pointer and the response tail pointer. The data storage device 100 may write the command head pointer and the response tail pointer and may read the command tail pointer and the response head pointer. In the data storage device 100, the controller 110 may perform the read and write actions. More specifically, the command processor 122 may be configured to perform the read and write actions for the data storage device 100. No other synchronization, other than the head and tail pointers, may be needed between the host 106 and the data storage device 100.

In one exemplary implementation, for performance reasons, the command head pointer and the response tail pointer may be stored in the host 106 (e.g., in host RAM). The command tail pointer and the response head pointer may be stored in the data storage device 100 in memory mapped I/O space within the controller 110.

The command buffer 119 and the response buffer 123 may be an arbitrary multiple of the command or response sizes, and the driver 107 and the data storage device 100 may be free to post and process commands and results as needed provided that they do not overrun the command buffer 119 and the response buffer 123. In one implementation, the command buffer 119 and the response buffer 123 are circular buffers, which enable flow control between the host 106 and the data storage device 100.

In one exemplary implementation, the host 106 may determine the size of the command buffer 119 and the response buffer 123. The buffers may be larger than the number of commands that the data storage device 100 can queue internally.

The host 106 may write a command to the command buffer 119 and update the command tail pointer to indicate to the data storage device 100, and the command processor 122 within the data storage device 100, that a new command is present. The write of the command tail pointer signals the command processor 122 that a new command is present. The command processor 122 is configured to read the command from the command buffer 119 using a DMA operation and is configured to update the head pointer using another DMA operation to indicate to the host 106 that the command processor 122 has received the command.

When the command processor 122 completes the command, the command processor 122 writes the response using a DMA operation and updates the response tail pointer with another DMA operation to indicate that the command is finished. The interrupt processor 124 is configured to signal the host 106 with an interrupt when new responses are available in the response buffer 123. The host 106 is configured to read the responses from the response buffer 123 and update the head pointer to indicate that it has received the response. In one exemplary implementation, the interrupt processor 124 may not send another interrupt to the host 106 until the previous interrupt has been acknowledged by the host 106 writing to the response head pointer.

In one exemplary implementation, the host 106, through its driver 107, may control when the interrupt processor 124 should generate interrupts. The host 106 may use one or more different interrupt mechanisms, including a combination of different interrupt mechanisms, to provide information to the interrupt processor 124 regarding interrupt processing. For instance, the host 106 through the driver 107 may configure the interrupt processor 124 to use a water mark interrupt mechanism, a timeout interrupt mechanism, a group interrupt mechanism, or a combination of these interrupt mechanisms.

In one exemplary implementation, the host 106 may set a ResponseMark parameter, which determines the water mark, and may set the ResponseDelay parameter, which determines the timeout. The host 106 may communicate these parameters to the interrupt processor 124. If the count of new responses in the response buffer 123 is equal to or greater than the ResponseMark, then an interrupt is generated by the interrupt processor 124 and the count is zeroed. If the time (e.g., time in microseconds) since the last interrupt is equal to or greater than the ResponseDelay and there are new responses in the response buffer 123, then the interrupt processor 124 generates an interrupt and the timeout is zeroed. If the host 106 removes the new response from the response buffer 123, the count of new responses is updated and the timeout is restarted. In this manner, the host 106 may poll ahead and avoid interrupts from the interrupt processor 124.

In another exemplary implementation, the host 106 may use a group interrupt mechanism to determine when the interrupt processor 124 should generate and send interrupts to the host 106. The commands may share a common value, which identifies the commands as part of the same group. For example, the driver 107 may group commands together and assign a same group number to the group of commands. The driver 107 may use an interrupt group field in the command header to assign a group number to the commands in a group. When all of the commands in a command group have completed, and the responses for all of those commands have been transferred from the command processor 122 to the response buffer 123 and the response tail is updated, then the interrupt processor 124 may generate and send the interrupt to the host 106. In this manner, the group interrupt mechanism may be used to reduce the time the host 106 needs to spend processing interrupts.

Each of the interrupt mechanisms may be separately enabled or disabled. Also, any combination of interrupt mechanisms may be used. For example, the driver 107 may set interrupt enable and disable flags in a QueueControl register to determine which of the interrupt mechanisms are enabled and which of the interrupt mechanisms are disabled. In this manner, the combination of the interrupts may be used to reduce the time that the host 106 needs to spend processing interrupts. The host 106 may use its resources to perform other tasks.

In one exemplary implementation, all of the interrupt mechanisms may be disabled. In this situation, the driver 107 may be configured to poll the response buffer 123 to determine if there are responses ready for processing. Having all of the interrupt mechanisms disabled may result in a lowest possible latency. It also may result in a high overhead for the driver 107.

In another exemplary implementation, the group interrupt mechanism may be enabled along with the timeout interrupt mechanism and/or the water mark interrupt mechanism. In this manner, if the number of commands in a designated group is larger than the response buffer 123, one of the other enabled interrupt mechanisms will function to interrupt the driver 107 to clear the responses from the response buffer 123 to provide space for the command processor 122 to add more responses to the response buffer 123.

The use of the different interrupt mechanisms, either alone or in combinations, may be used to adjust the latency and/or the overhead with respect to the driver 107. For example, in one exemplary implementation, only the timeout interrupt mechanism may be enabled. In this situation, the overhead on the driver 107 may be reduced. In another exemplary implementation, only the water mark interrupt mechanism may be enabled. In this situation, the latency may be reduced to a lower level.

In some exemplary situations, a particular type of application being used may factor into the determination of which interrupt mechanisms are enabled. For example, a web search application may be latency sensitive and may the interrupt mechanisms may be enabled in particular combinations to provide the best latency sensitivity for the web search application. In another example, a web indexing application may not be as sensitive to latency as a web search application. Instead, processor performance may be a more important parameter. In this application, the interrupt mechanisms may be enabled in particular combinations to allow low overhead, even at the expense of increased latency.

In one exemplary implementation, the driver 107 may determine a command group based on an input/output (I/O) operation received from an application 113 through the operating system 109. For example, the application 113 may request a read operation of multiple megabytes. In this instance, the application 113 may not be able to use partial responses and the only useful information for the application 113 may be when the entire operation has been completed. Typically, the read operation may be broken up into many multiple commands. The driver 107 may be configured to recognize the read operation as a group of commands and to assign the commands in that group the same group number in each of the command headers. An interface between the application 113 and the driver 107 may be used to indicate to the driver 107 that certain operations are to be treated as a group. The interface may be configured to group operations based on different criteria including, but not limited to, the type of command, the size of the data request associated with the command, the type of data requested including requests from multiple different applications, the priority of the request, and combinations thereof.

In some implementations, the application 113 may pass individual command information relating to an operation to the operating system 109 and ultimately to the driver 107. In other exemplary implementations, the driver 107 may designate one or more threads of commands to be considered a group.

Figure 2:
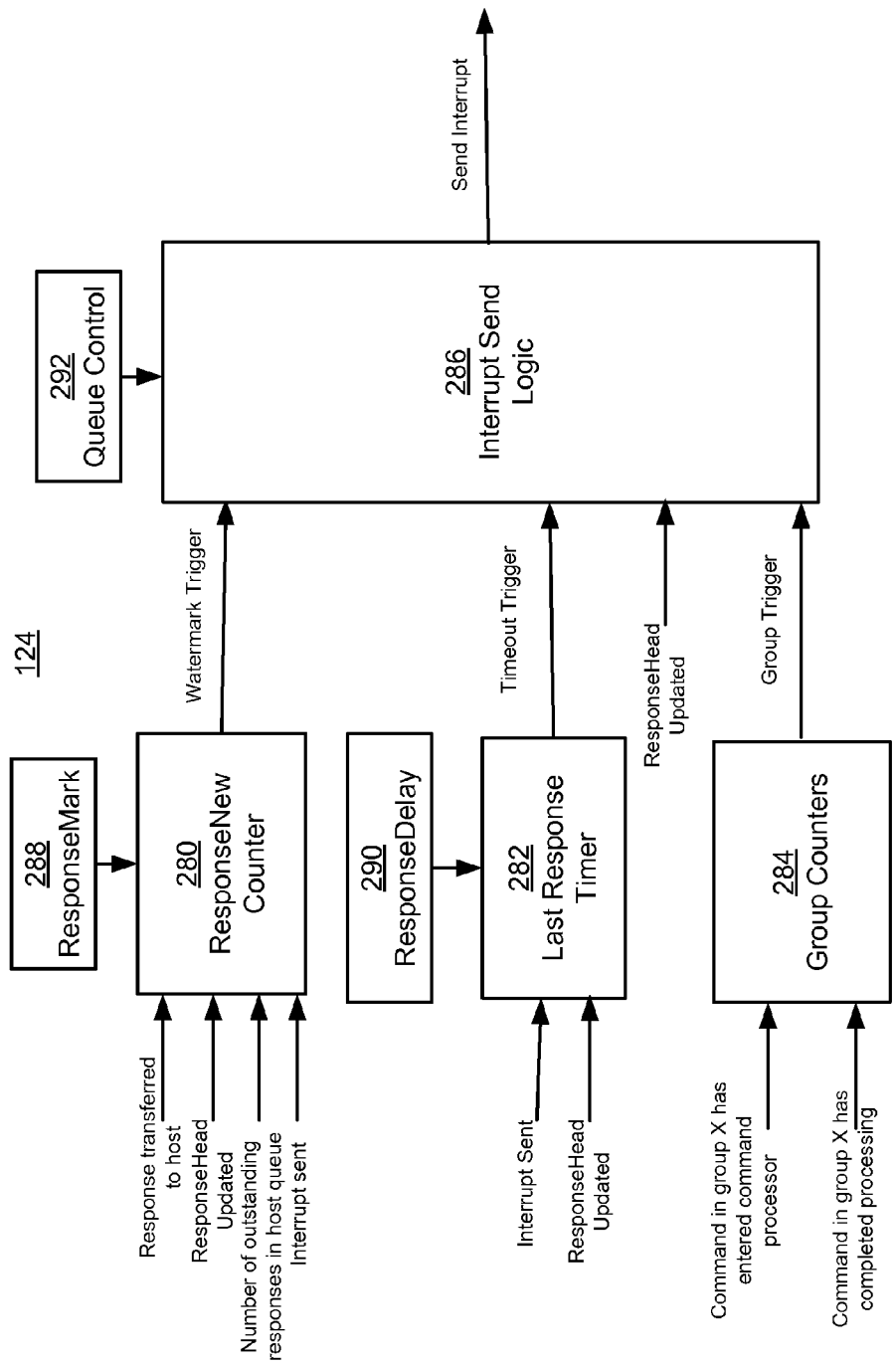
FIG. 2 is an exemplary block diagram of an interrupt processor.

Referring to FIG. 2, a block diagram of an exemplary interrupt processor 124 is illustrated. The interrupt processor 124 may be configured to generate and send interrupts based on the interrupts mechanism or mechanisms enabled by the host 106. The interrupt processor 124 may include a ResponseNew counter 280, a last response timer 282, group counters 284 and interrupt send logic 286.

The ResponseNew counter 280 may be enabled by the host 106 when the watermark interrupt mechanism is desired. The host 106 may set the ResponseMark 288, which is a parameter provided as input to the ResponseNew counter 280, as discussed above. The ResponseNew counter 280 receives as inputs information including when a response is transferred to the host 106, when the ResponseHead is updated, the number of outstanding responses in the host response buffer 123 and when an interrupt has been sent. The ResponseNew counter 280 is configured to track the number of responses transferred to the host 106 that the host has yet to see. Each time a response is transferred to the response buffer 123 the counter is incremented. When the counter 280 reaches or exceed the watermark level set by the host 106, i.e., the ResponseMark 288, then a watermark trigger is generated and sent to the interrupt send logic 286. The watermark level, i.e., the ResponseMark 288, is the number of new responses in the response buffer 123 needed to generate an interrupt. If the host 106 removes new responses from the response buffer 123, they do not count toward meeting the watermark level. When an interrupt is generated, the count toward the ResponseMark is reset.

If the watermark interrupt mechanism is the only interrupt enabled, when the watermark is reached, then the interrupt send logic 286 generates and sends an interrupt to the host 106. No further interrupts will be sent until the host 106 acknowledges the interrupt and updates the ResponseHead. The updated ResponseHead is communicated to the interrupt send logic 286 as a clear interrupt signal. If other interrupt mechanisms also are enabled, then the interrupt send logic 286 may generate and send an interrupt to the host 106 taking into account the other enabled interrupt mechanisms as well.

The last response timer 282 may be enabled when the timer interrupt mechanism is desired. The last response timer 282 may be configured to keep track of time since the last interrupt. For instance, the last response timer 282 may track the amount of time since the last interrupt in microseconds. The host 106 may set the amount of time using a parameter, for example, a ResponseDelay parameter 290. In one exemplary implementation, the ResponseDelay 290 timeout may be the number of microseconds since the last interrupt, or since the last time that the host 106 removed new responses from the response buffer 123, before an interrupt is generated.

The last response timer 282 receives as input a signal indicating when an interrupt is sent. The last response timer 282 also may receive a signal when the ResponseHead is updated, which indicates that the host 106 has removed responses from the response buffer 123. An interrupt may be generated only if the response buffer 123 contains outstanding responses.

The last response timer 282 is configured to generate a timeout trigger when the amount of time being tracked by the last response timer 282 is greater than the ResponseDelay parameter 290. When this occurs and the response buffer 123 contains new responses, then a timeout trigger signal is sent to the interrupt send logic 286. If the last response timer 282 is the only interrupt mechanism enabled, then the interrupt send logic 286 generates and sends an interrupt to the host. If other interrupt mechanisms also are enabled, then the interrupt send logic 286 may take into account the other interrupt mechanisms as well.

Each interrupt mechanism includes an enable bit and the interrupt send logic 286 may be configured to generate an interrupt when an interrupt trigger is asserted for an enabled interrupt mechanism. The logic may be configure not to generate another interrupt until the host 106 acknowledges the interrupt and updates the ResponseHead. The Queue Control parameter 292 may provide input to the interrupt send logic 286 to indicate the status of the interrupt mechanisms such as which of the interrupt mechanisms are enabled and which of the interrupt mechanisms are disabled.

The group counters 284 mechanism may be arranged and configured to track commands that are part of a group as designated by the driver 107. The group counters 284 may be enabled by the host 106 when the host 106 desires to track commands as part of a group such that a single interrupt is generated and sent back to the host 106 only when all of the commands in a group are processed. In this manner, an interrupt is not generated for each of the individual commands but only for the group of commands.

The group counters 284 may be configured with multiple counters to enable the tracking of multiple different groups of commands. In one exemplary implementation, the group counters 284 may be configured to track up to and including 128 different groups of commands. In this manner, for each group of commands there is a counter. The number of counters may be related to the number of group numbers that may be designated using the interrupt group field in the command header.

The group counters 284 may be configured to increment the counter for a group when a new command for the group has entered the command processor 122. The group counters 284 may decrement the counter for a group when one of the commands in the group has completed processing. In this manner of incrementing as new commands enter for a group and decrementing when commands are completed for the group, the number of commands in each group is potentially unlimited. The counters do not need to be sized to account for the largest number of potential commands in a group. Instead, the counters may be sized based on the number of commands that the data storage device 100 may potentially process at one time, which may be smaller than the unlimited number of commands in a particular group.

In one exemplary implementation, each of the group counters 284 may track the commands in a specific group using the group number assigned by the driver 107 and appearing in the interrupt group field in the command header of each command. The group counters 284 receive a signal each time a command having a group number enters the command processor 122 for processing. In response to this signal, the counter increments for that group. The group counters 284 also receive a signal each time a command having a group number completes processing. In response to this signal, the counter decrements for that group.

The last command in the command group may be marked by the driver 107 with a flag to indicate to the group counters 284 that the command is the last command in the group. In one exemplary implementation, the last bit in the interrupt group field in the command header may be used as the flag. The group counters 284 are configured to recognize when the flag is set. In this manner, the group counters 284 keep a counter of the number of commands in a particular group that are in processing in the data storage device 100. The group counters 284 also track when the end of the group has been seen.

When a command is sent from the host 106 to the data storage device 100, the counter for its interrupt group is incremented. When a response is sent from the data storage device 100 to the host 106, the counter for its interrupt group is decremented. When the last command in the group is received at the groups counters 284 and the count for that group goes to zero, the group trigger signal is generated and sent to the interrupt send logic 286. When the group trigger signal is received at the interrupt send logic 286, then an interrupt is sent to the host 106. The group counters 284 then clear the end group flag for that group.

The driver 107 may be configured to track the groups in use. The driver 107 may not re-use an interrupt group number until the previous commands to use that interrupt group have all completed and the interrupt has been acknowledged.

In one exemplary implementation, the driver 107 may be configured to determine dynamically how many interrupts it wants to have generated. For example, the driver 107 may dynamically determine the size of a command group depending on various criteria including, for instance, volume, latency and other factors on the host 106.

In one exemplary implementation, the interrupt send logic 286 may be configured to consolidate multiple interrupts for multiple interrupt groups and only send a single interrupt for multiple groups of commands.

Figure 3:
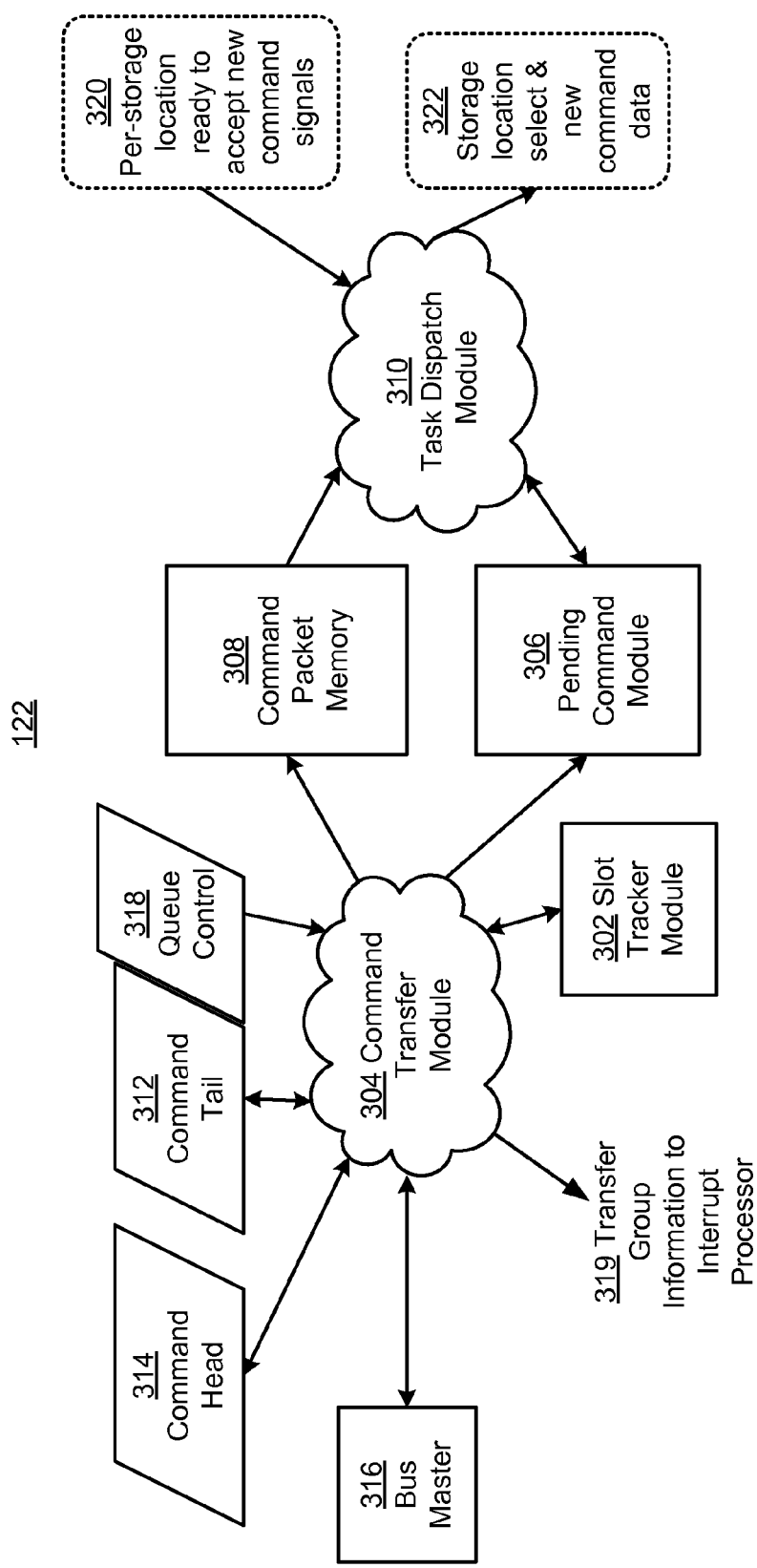
FIG. 3 is an exemplary block diagram of a command processor for the data storage device.

FIG. 3 is a block diagram of a command processor 122. The command processor 122 may include a slot tracker module 302, a command transfer module 304, a pending command module 306, a command packet memory 308, and a task dispatch module 310. The command processor 122 may be implemented in hardware, software or a combination of hardware and software. In one exemplary implementation, the command processor 122 may be implemented as a part of a field programmable gate array (FPGA) controller. The FPGA controller may be configured using firmware or other instructions to program the FPGA controller to perform the functions discussed herein.

The command processor 122 may be arranged and configured to retrieve commands from a host and to queue and order the commands from the host for processing by various storage locations. The command processor 122 may be configured to maximize the availability of the storage locations by attempting to keep all or substantially all of the storage locations busy. The command processor 122 may be configured to dispatch commands designated for the same storage location in order such that the order of the commands received from the host is preserved. The command processor 122 may be configured to reorder and dispatch commands designated for different storage locations out of order. In this manner, the commands received from the host may be processed in parallel by reordering the commands designated for different storage locations and, at the same time, the order of the commands designated for the same storage location is preserved.

In one exemplary implementation, the command processor 122 may use an ordered list to queue and order the commands from the host. In one exemplary implementation, the ordered list may be sorted and/or otherwise ordered based on the age of the commands from the host. For instance, as new commands are received from the host, those commands are placed at the bottom of the ordered list in the order that they were received from the host. In this manner, commands that are dependent on order (e.g., commands designated for the same storage location) are maintained in the correct order.

In one exemplary implementation, the storage locations may include multiple flash memory chips. The flash memory chips may be arranged and configured into multiple channels with each of the channels including one or more of the flash memory chips. The command processor 122 may be arranged and configured to dispatch commands designated for the same channel and/or the same flash memory chip in order based on the ordered list. Also, the command processor 122 may be arranged and configured to dispatch commands designated for different channels and/or different flash memory chips out of order. In this manner, the command processor 122 may, if needed, reorder the commands from the ordered list so that the channels and the flash memory chips may be kept busy at the same time. This enables the commands from the host to be processed in parallel and enables more commands to be processed at the same time on different channels and different flash memory chips.

The commands from the host may be dispatched and tracked under the control of a driver (e.g., driver 107 of FIG. 1), where the driver may be a computer program product that is tangibly embodied on a storage medium and may include instructions for generating and dispatching commands from the host (e.g., host 106 of FIG. 1). The commands from the host may designate a specific storage location, for example, a specific flash memory chip and/or a specific channel. From the host perspective, it may be important that commands designated for the same storage location be executed in the order as specified by the host. For example, it may be important that certain operations generated by the host occur in order on a same flash memory chip. For example, the host may generate and send an erase command and a write command for a specific flash memory chip, where the host desires that the erase command occurs first. It is important that the erase operation occurs first so that the data associated with the write command doesn't get erased immediately after it is written to the flash memory chip.

As another example, for flash memory chips, it may be important to write to pages of an erase block in order. This operation may include multiple commands to perform the operation on the same flash memory chip. In this example, it is necessary to perform these commands for this operation in the order specified by the host. For instance, a single write operation may include more than sixty commands. The command processor 122 may be configured to ensure that commands to the same flash memory chip are performed in order using the ordered list.

In one exemplary implementation, the command processor 122 may be configured to track a number of commands being processed. The command processor 122 may be configured to track a number of available slots for commands to be received and processed. One of the components of the command processor 122, the slot tracker module 302, may be configured to track available slots for commands from the host. The slot tracker module 302 may keep track of the open slots, provide the slots to new commands transferred from the host and designate the slots as open upon completion of the commands.

In one exemplary implementation, the slot tracker module 302 may include a fixed number of slots, where each slot may be designated for a single command. For example, the slot tracker module 302 may include 128 slots. In other exemplary implementations, the slot tracker module 302 may include a different number of fixed slots. Also, for example, the number of slots may be variable or configurable. The slot tracker module 302 may be implemented as a register or memory module in software, hardware or a combination of hardware and software.

The slot tracker module 302 may include a list of slots, where each of the slots is associated with a global slot identifier. As commands are received from the host, the commands are assigned to an available slot and associated with the global slot identifier for that slot. The slot tracker module 302 may be configured to assign each of the commands a global slot identifier, where the number of global slot identifier is fixed to match the number of slots in the slot tracker module 302. The command is associated with the global slot identifier throughout its processing until the command is completed and the slot is released. In one exemplary implementation, the global slot identifier is a tag associated with a particular slot that is assigned to a command that fills that particular slot. The tag is associated with the command and remains with the command until processing of the command is complete and the slot it occupied is released and made available to receive a new command. The commands may not be placed in order of slots, but instead may be placed in any of the available slots and assigned the global slot identifier associated with that slot.

In one exemplary implementation, one of the components of the command processor 122, the command transfer module 304, may be configured to retrieve new commands from the host based on a number of available slots in the slot tracker module 302 and an availability of new commands at the host. In one exemplary implementation, the command transfer module 304 may be implemented as a state machine.

The slot tracker module 302 may provide information to the command transfer module 304 regarding the number of available slots. Also, the command transfer module 304 may query the slot tracker module 302 regarding the number of available slots.

In one exemplary implementation, the command transfer module 304 may use a command tail pointer 312 and a command head pointer 314 to indicate when and how many new commands are available at the host for retrieval. The command transfer module 304 may compare the command tail pointer 312 and the command head pointer 314 to determine whether there are commands available for retrieval from the host. If the command tail pointer 312 and the command head pointer 314 are equal, then no commands are available for transfer. If the command tail pointer 312 is greater than the command head pointer 314, then commands are available for transfer.

In one exemplary implementation, the command tail pointer 312 and the command head pointer 314 may be implemented as registers that are configured to hold a pointer value and may be a part of the command processor 122. The command tail pointer 314 may be written to by the host. For example, the driver may use a memory mapped input/output (MMIO) write to update the command tail pointer 312 when commands are available at the host for retrieval. As commands are retrieved from the host, the command transfer module 304 updates the command head pointer 314.

When the conditions of available slots and available commands at the host are met, the command transfer module 304 may retrieve some or all of the available commands from the host. In one exemplary implementation, the command transfer module 304 may retrieve a group of commands in a single access. For example, the command transfer module 304 may be configured to retrieve a group of eight commands at a time using a direct memory access (DMA) operation from the host.

When the commands are retrieved, the command transfer module 304 updates the command head pointer 314. The commands may be retrieved from the host through the bus master 316. The command transfer module 304 also may write to a host command head pointer (not shown) through the bus master 316 using a DMA operation to update the host command head pointer.

The queue control 318 may be configured to enable and disable the command transfer module 304. The queue control 318 may be implemented as a register that receives instructions from the host through the driver. The queue control 318 may be a component of the command processor 122. When the queue control 318 register is set to enable, then the command transfer module 304 may retrieve and process commands from the host. The driver controls the setting of the queue control 318 so that the command transfer module 304 retrieves commands only when the host is ready and has provided the indication that it is ready. When the queue control 318 register is set to disable, then the command transfer module 104 may not retrieve and process command from the host.

The retrieved commands are each assigned to one of the available slots by the slot tracker module 302 and associated with the global slot identifier for that available slot. The data for the commands may be stored in the command packet memory 308. For example, the command packet memory 308 may be implemented as a fixed buffer that is indexed by global slot identifier. The data for a particular command may be stored in the command packet memory 308 and indexed by its assigned global slot identifier. The data for a particular command may remain in the command packet memory 308 until the command is dispatched to the designated storage location by the task dispatch module 310.

The command transfer module 304 also may be configured to provide other components of a controller with information related to the commands as indexed by slot. For example, the command transfer module 304 may provide data to a DMA engine. The command transfer module 304 also may provide status packet header data to a status processor. The command transfer module 304 may provide interrupt group data to an interrupt processor. For example, the command transfer module 304 may transfer group information 319 to the interrupt processor (e.g., interrupt processor 124 of FIGS. 1 and 2).

The pending command module 306 may be configured to queue and order the commands using an ordered list that is based on an age of the commands. In one exemplary implementation, the pending command module 306 may be implemented as a memory module that is configured to store multiple pointers to queue and order the commands. The pending command module 306 may include a list of the global slot identifiers for the commands that are pending along with a storage location identifier. For example, the storage location identifier may include the designated storage location for where the command is to be processed. The storage location identifier may include a channel identifier and/or a flash memory chip identifier. The storage location identifier is a part of the command and is assigned by the host through its driver.

When a new command is retrieved, the global slot identifier and storage location information are added to the bottom of the ordered list in the pending command module 306. As discussed above, the data for the commands is stored in the command packet memory 308 and indexed by the global slot identifier. When the command is added to the ordered list, a pointer to the previous command is included with the command. Also included is a pointer to the next command. In this manner, each item in the ordered list includes a global task identifier, a storage location identifier, a pointer to the previous command and a pointer to the next command. In this exemplary implementation, the ordered list may be referred to as a doubly linked list. The ordered list is a list of the commands ordered from oldest to newest.

The task dispatch module 310 is configured to remove commands from the ordered list in the pending command module 306 and to dispatch them to the appropriate storage location for processing. The task dispatch module 310 may receive input from the storage locations to indicate that they are ready to accept new commands. In one exemplary implementation, the task dispatch module 310 may receive one or more signals 320 such as signals indicating that one or more of the storage locations are ready to accept new commands. The pending command module 306 may be configured to start at the top of the ordered list with the oldest command first and to make that command available to the task dispatch module 310. The pending command module 306 may continue to make commands available to the task dispatch module 310 in order using the ordered list until a command is removed from the list by the task dispatch module 310. After a command is removed from the ordered list in the pending command module 306, the pending command module 306 plays back the commands remaining in the list to the task dispatch module 310 starting again at the top of the ordered list.

The task dispatch module 310 may be configured to start at the top of the ordered list with the oldest command first and determine whether the storage location is available to receive new commands using the signals 320. If the storage location is ready, then the task dispatch module 310 retrieves the command data from the command packet memory 308 and communicates the command data and a storage location select signal 322 to the storage location. The pending command module 306 then updates the ordered list and the pointers to reflect that the command was dispatched for processing. Once a command has been dispatched, the task dispatch module 310 starts at the top of the ordered list again.

If the storage location is not ready to receive new commands, then the task dispatch module 310 moves to the next command on the ordered list. The task dispatch module 310 determines if the next command is to the same or a different storage location than the skipped command. If the next command is to a same storage location as a skipped command, then the task dispatch module 310 also will skip this command. In this manner, the commands designated for the same storage location are dispatched and processed in order, as received from the host. The task dispatch module 310 preserves the order of commands designated for the same storage location. If the commands are designated for a different storage location, the task dispatch module 310 again determines if the storage location for the next command on the list is ready to accept the new command. If the task dispatch module 310 receives a signal 320 that the storage location is ready to accept a new command, then the command is dispatched by the task dispatch module 310 from the command packet memory 308 to the storage location along with a storage location select signal 322. The pending command module 306 removes the dispatched command from the ordered list and updates the ordered list including updating the pointers that were associated with the command. In this manner, the remaining pointers are linked together upon removal of the dispatched command.

Figure 4:
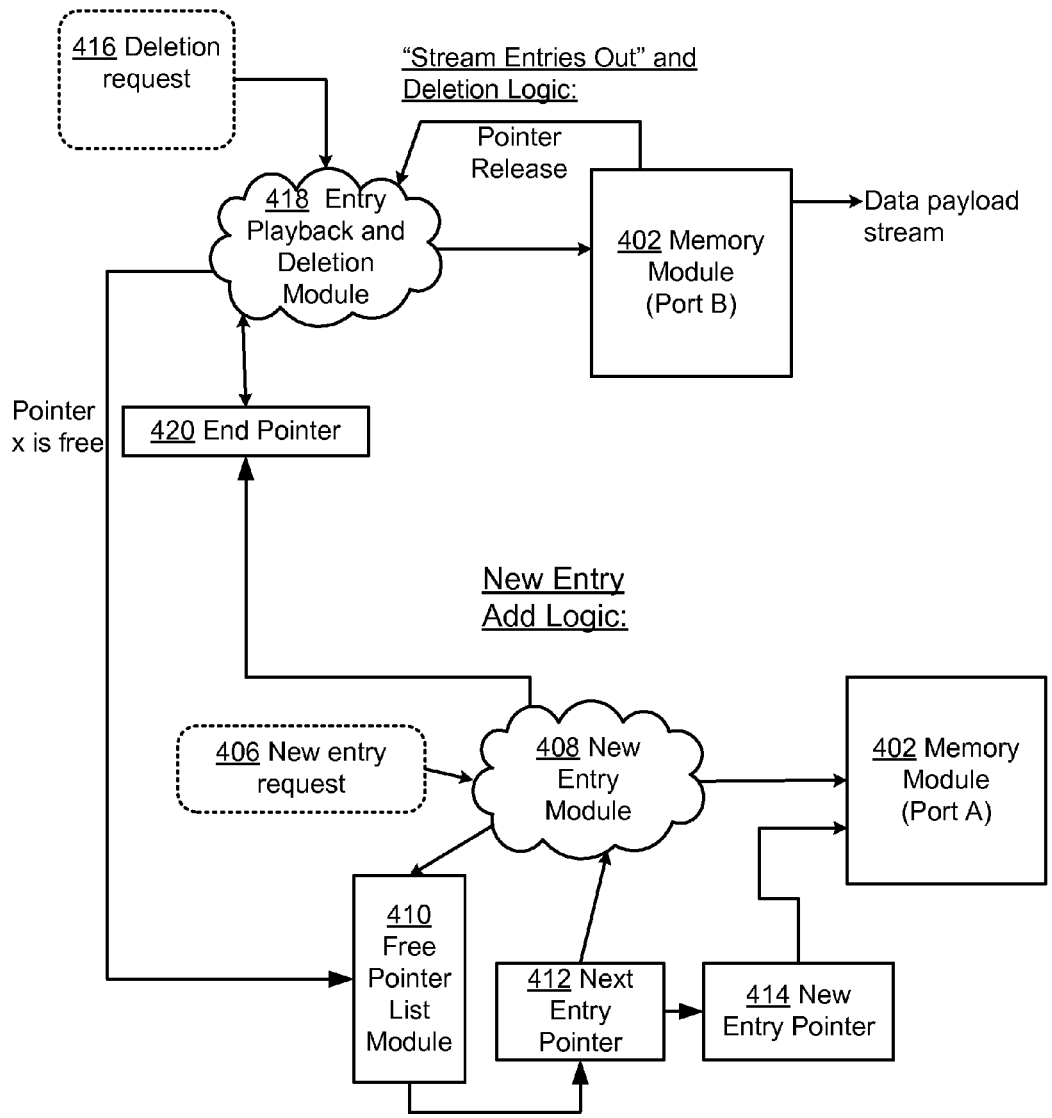
FIG. 4 is an exemplary block diagram of a pending command module.

Referring also to FIG. 4, a block diagram of the pending command module 306 is illustrated. The pending command module 306 may include a single memory module 402 having multiple ports, port A and port B. The memory module 402 may store information related to the pending commands, including the pointer information for each command, where the pointer information may point to the next command and the previous command.

In operation, the command transfer module 304 of FIG. 3 sends a new entry request 406 for a new command to be added to the ordered list to the pending command module 306. The new entry request 406 is received by a new entry module 408. In one exemplary implementation, the new entry module 408 may be implemented as a state machine.

The new entry module 408 receives the new entry request 406 and adds it to the ordered list at the end of the list as the newest command in memory module 402. Also, the new entry module 408 requests pointers from the free pointer list module 410. The free pointer list module 410 may be implemented as a first-in, first-out (FIFO) memory that maintains a list of pointers that can be used for new entries.

When the new entry module 408 requests pointers from the free pointer list module 410, the free pointer list module 410 provides a next entry pointer 412 to the new entry module 408. The next entry pointer 412 is a pointer to where the entry following the current new entry will reside on the ordered list. The current new entry in the list points to this address as its next address. The new entry pointer 414 is a pointer to where the current new entry will reside on the ordered list, which was the previous entry's next entry pointer 412. The last entry in the list points to this address as its next address. The memory module 402 stores the data fields related to the commands and the pointers. When a new entry is added, an end pointer 420 also is updated.

For example, if an entry "X" is to be added, the next entry pointer 412 points to the next entry "Y" and the new entry pointer 414 points to the current entry that is to be added, "X". After "X" is entered and an entry "Y" is to be added, the next entry pointer 412 points to the next entry "Z" and the new entry pointer 414 points to the current entry that is to be added, "Y".

When the task dispatch module 310 of FIG. 3 determines that an entry is to be removed from the ordered list in the memory module 402, the task dispatch module sends a deletion request 416. The deletion request is received by an entry playback and deletion module 418. The entry playback and deletion module 418 may be configured to start at the top of the ordered list with the oldest command first and to make that command available to the task dispatch module 310. The entry playback and deletion module 418 may continue to make commands available to the task dispatch module 310 in order using the ordered list until a command is removed from the list by the task dispatch module 310. After a command is removed from the ordered list, the entry playback and deletion module 418 causes the memory module 402 to dispatch the command and remove it from the ordered list. The pointers are then freed up and the entry playback and deletion module 418 provides an indication to the free pointer list module 410 that the pointers for the removed command are free. The entry playback and deletion module 418 also updates the pointers in the memory module 402 when the command is removed to maintain the correct order of the list. The entry playback and deletion module 418 also plays back the commands remaining in the list to the task dispatch module 310 starting again at the top of the ordered list.

In one exemplary implementation, the entry playback and deletion module 418 may be implemented as a state machine. The entry playback and deletion module 418 also receives an input of the end pointer 420 from the new entry module 408. The end pointer 420 may be used when the entry playback and deletion module 418 is making commands available to the task dispatch module 310 and when a last entry in the ordered list is removed from the list. In this manner, the end pointer 420 may be updated to point to the end of the ordered list.

Figure 5:
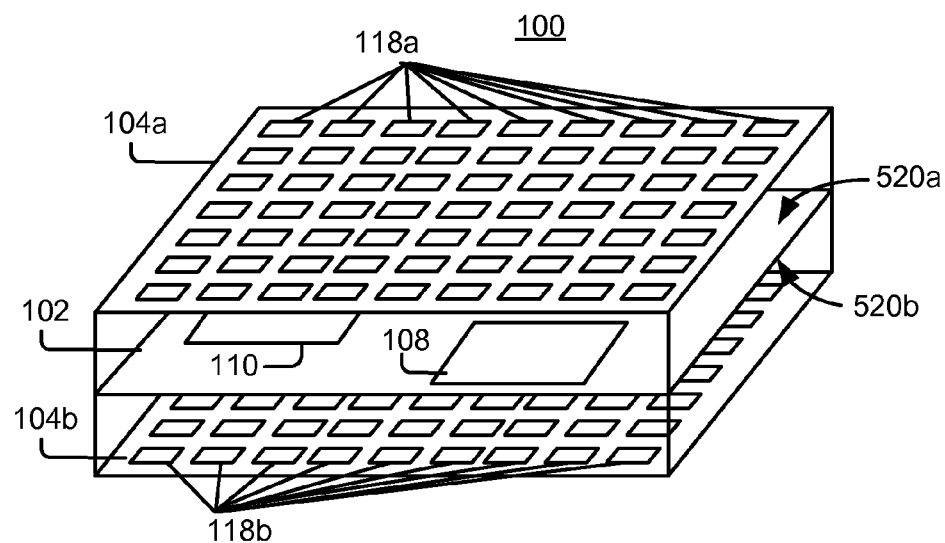
FIG. 5 is an exemplary perspective block diagram of the printed circuit boards of the data storage device.

Referring back to FIG. 1, in one exemplary implementation, the controller board 102, which is its own PCB, may be located physically between each of the memory boards 104a and 104b, which are on their own separate PCBs. Referring also to FIG. 5, the data storage device 100 may include the memory board 104a on one PCB, the controller board 102 on a second PCB, and the memory board 104b on a third PCB. The memory board 104a includes multiple flash memory chips 118a and the memory board 104b includes multiple flash memory chips 118b. The controller board 102 includes the controller 110 and the interface 108 to the host (not shown), as well as other components (not shown).

In the example illustrated by FIG. 5, the memory board 104a may be operably connected to the controller board 102 and located on one side 520a of the controller board 102. For instance, the memory board 104a may be connected to a top side 520a of the controller board 102. The memory board 104b may be operably connected to the controller board 102 and located on a second side 520b of the controller board 102. For instance, the memory board 104b may be connected to a bottom side 520b of the controller board 102.

Other physical and/or electrical connection arrangements between the memory boards 104a and 104b and the controller board 102 are possible. FIG. 5 merely illustrates one exemplary arrangement. For example, the data storage device 100 may include more than two memory board such as three memory boards, four memory boards or more memory boards, where all of the memory boards are connected to a single controller board. In this manner, the data storage device may still be configured in a disk drive form factor. Also, the memory boards may be connected to the controller board in other arrangements such as, for instance, the controller board on the top and the memory cards on the bottom or the controller board on the bottom and the memory cards on the top.

Figure 6:
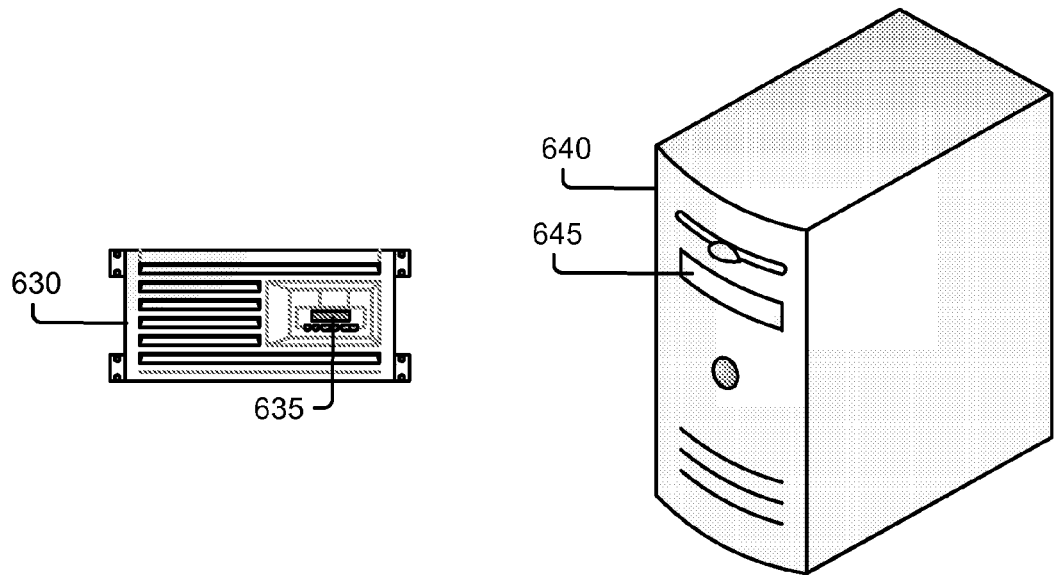
FIG. 6 is an exemplary block diagram of exemplary computing devices for use with the data storage device of FIG. 1.

The data storage device 100 may be arranged and configured to cooperate with a computing device. In one exemplary implementation, the controller board 102 and the memory boards 104a and 104b may be arranged and configured to fit within a drive bay of a computing device. Referring to FIG. 6, two exemplary computing devices are illustrated, namely a server 630 and a server 640. The servers 630 and 640 may be arranged and configured to provide various different types of computing services. The servers 630 and 640 may include a host (e.g., host 106 of FIG. 1) that includes computer program products having instructions that cause one or more processors in the servers 630 and 640 to provide computing services. The type of server may be dependent on one or more application programs (e.g., application(s) 113 of FIG. 1) that are operating on the server. For instance, the servers 630 and 640 may be application servers, web servers, email servers, search servers, streaming media servers, e-commerce servers, file transfer protocol (FTP) servers, other types of servers or combinations of these servers. The server 630 may be configured to be a rack-mounted server that operates within a server rack. The server 640 may be configured to be a standalone server that operates independent of a server rack. Even though the server 640 is not within a server rack, it may be configured to operate with other servers and may be operably connected to other servers. Servers 630 and 640 are meant to illustrate example computing devices and other computing devices, including other types of servers, may be used.

In one exemplary implementation, the data storage device 100 of FIGS. 1 and 5 may be sized to fit within a drive bay 635 of the server 630 or the drive bay 645 of the server 640 to provide data storage functionality for the servers 630 and 640. For instance, the data storage device 100 may be sized to a 3.5" disk drive form factor to fit in the drive bays 635 and 645. The data storage device 100 also may be configured to other sizes. The data storage device 100 may operably connect and communicate with the servers 630 and 560 using the interface 108. In this manner, the host may communicate commands to the controller board 102 using the interface 108 and the controller 110 may execute the commands using the flash memory chips 118a and 118b on the memory boards 104a and 104b.

Referring back to FIG. 1, the interface 108 may include a high speed interface between the controller 110 and the host 106. The high speed interface may enable for fast transfers of data between the host 106 and the flash memory chips 118a and 118b. In one exemplary implementation, the high speed interface may include a PCIe interface. For instance, the PCIe interface may be a PCIe x4 interface or a PCIe x8 interface. The PCIe interface 108 may include a connector to the host 106 such as, for example, PCIe connector cable assembly. Other high speed interfaces, connectors and connector assemblies also may be used.

In one exemplary implementation, the communication between the controller board 102 and the flash memory chips 118a and 118b on the memory boards 104a and 104b may be arranged and configured into multiple channels 112. Each of the channels 112 may communicate with one or more flash memory chips 118a and 118b and may be controlled by the channel controllers (not shown). The controller 110 may be configured such that commands received from the host 106 may be executed by the controller 110 using each of the channels 112 simultaneously or at least substantially simultaneously. In this manner, multiple commands may be executed simultaneously on different channels 112, which may improve throughput of the data storage device 100.

In the example of FIG. 1, twenty (20) channels 112 are illustrated. The completely solid lines illustrate the ten (10) channels between the controller 110 and the flash memory chips 118a on the memory board 104a. The mixed solid and dashed lines illustrate the ten (10) channels between the controller 110 and the flash memory chips 118b on the memory board 104b. As illustrated in FIG. 1, each of the channels 112 may support multiple flash memory chips. For instance, each of the channels 112 may support up to 32 flash memory chips. In one exemplary implementation, each of the 20 channels may be configured to support and communicate with 6 flash memory chips. In this example, each of the memory boards 104a and 104b would include 60 flash memory chips each. Depending on the type and the number of the flash memory chips 118a and 118b, the data storage device 100 may be configured to store up to and including multiple terabytes of data.

The controller 110 may include a microcontroller, a FPGA controller, other types of controllers, or combinations of these controllers. In one exemplary implementation, the controller 110 is a microcontroller. The microcontroller may be implemented in hardware, software, or a combination of hardware and software. For example, the microcontroller may be loaded with a computer program product from memory (e.g., memory module 116) including instructions that, when executed, may cause the microcontroller to perform in a certain manner. The microcontroller may be configured to receive commands from the host 106 using the interface 108 and to execute the commands. For instance, the commands may include commands to read, write, copy and erase blocks of data using the flash memory chips 118a and 118b, as well as other commands.

In another exemplary implementation, the controller 110 is a FPGA controller. The FPGA controller may be implemented in hardware, software, or a combination of hardware and software. For example, the FPGA controller may be loaded with firmware from memory (e.g., memory module 116) including instructions that, when executed, may cause the FPGA controller to perform in a certain manner. The FPGA controller may be configured to receive commands from the host 106 using the interface 108 and to execute the commands. For instance, the commands may include commands to read, write, copy and erase blocks of data using the flash memory chips 118a and 118b, as well as other commands.

In one exemplary implementation, the FPGA controller may support multiple interfaces 108 with the host 106. For instance, the FPGA controller may be configured to support multiple PCIe x4 or PCIe x8 interfaces with the host 106.

The memory module 116 may be configured to store data, which may be loaded to the controller 110. For instance, the memory module 116 may be configured to store one or more images for the FPGA controller, where the images include firmware for use by the FPGA controller. The memory module 116 may interface with the host 106 to communicate with the host 106. The memory module 116 may interface directly with the host 106 and/or may interface indirectly with the host 106 through the controller 110. For example, the host 106 may communicate one or more images of firmware to the memory module 116 for storage. In one exemplary implementation, the memory module 116 includes an electrically erasable programmable read-only memory (EEPROM). The memory module 116 also may include other types of memory modules.

The power module 114 may be configured to receive power (Vin), to perform any conversions of the received power and to output an output power (Vout). The power module 114 may receive power (Vin) from the host 106 or from another source. The power module 114 may provide power (Vout) to the controller board 102 and the components on the controller board 102, including the controller 110. The power module 114 also may provide power (Vout) to the memory boards 104a and 104b and the components on the memory boards 104a and 104b, including the flash memory chips 118a and 118b.

In one exemplary implementation, the power module 114 may include one or more direct current (DC) to DC converters. The DC to DC converters may be configured to receive a power in (Vin) and to convert the power to one or more different voltage levels (Vout). For example, the power module 114 may be configured to receive +12 V (Vin) and to convert the power to 3.3 v, 1.2 v, or 1.8 v and to supply the power out (Vout) to the controller board 102 and to the memory boards 104a and 104b.

The memory boards 104a and 104b may be configured to handle different types of flash memory chips 118a and 118b. In one exemplary implementation, the flash memory chips 118a and the flash memory chips 118b may be the same type of flash memory chips including requiring the same voltage from the power module 114 and being from the same flash memory chip vendor. The terms vendor and manufacturer are used interchangeably throughout this document.

In another exemplary implementation, the flash memory chips 118a on the memory board 104a may be a different type of flash memory chip from the flash memory chips 118b on the memory board 104b. For example, the memory board 104a may include SLC NAND flash memory chips and the memory board 104b may include MLC NAND flash memory chips. In another example, the memory board 104a may include flash memory chips from one flash memory chip manufacturer and the memory board 104b may include flash memory chips from a different flash memory chip manufacturer. The flexibility to have all the same type of flash memory chips or to have different types of flash memory chips enables the data storage device 100 to be tailored to different application(s) 113 being used by the host 106.

In another exemplary implementation, the memory boards 104a and 104b may include different types of flash memory chips on the same memory board. For example, the memory board 104a may include both SLC NAND chips and MLC NAND chips on the same PCB. Similarly, the memory board 104b may include both SLC NAND chips and MLC NAND chips. In this manner, the data storage device 100 may be advantageously tailored to meet the specifications of the host 106.

In another exemplary implementation, the memory boards 104a and 104b may include other types of memory devices, including non-flash memory chips. For instance, the memory boards 104a and 104b may include random access memory (RAM) such as, for instance, dynamic RAM (DRAM) and static RAM (SRAM) as well as other types of RAM and other types of memory devices. In one exemplary implementation, the both of the memory boards 104a and 104b may include RAM. In another exemplary implementation, one of the memory boards may include RAM and the other memory board may include flash memory chips. Also, one of the memory boards may include both RAM and flash memory chips.

The memory modules 120a and 120b on the memory boards 104a and 104b may be used to store information related to the flash memory chips 118a and 118b, respectively. In one exemplary implementation, the memory modules 120a and 120b may store device characteristics of the flash memory chips. The device characteristics may include whether the chips are SLC chips or MLC chips, whether the chips are NAND or NOR chips, a number of chip selects, a number of blocks, a number of pages per block, a number of bytes per page and a speed of the chips.

In one exemplary implementation, the memory modules 120a and 120b may include serial EEPROMs. The EEPROMs may store the device characteristics. The device characteristics may be compiled once for any given type of flash memory chip and the appropriate EEPROM image may be generated with the device characteristics. When the memory boards 104a and 104b are operably connected to the controller board 102, then the device characteristics may be read from the EEPROMs such that the controller 110 may automatically recognize the types of flash memory chips 118a and 118b that the controller 110 is controlling. Additionally, the device characteristics may be used to configure the controller 110 to the appropriate parameters for the specific type or types of flash memory chips 118a and 118b.

Figure 7:
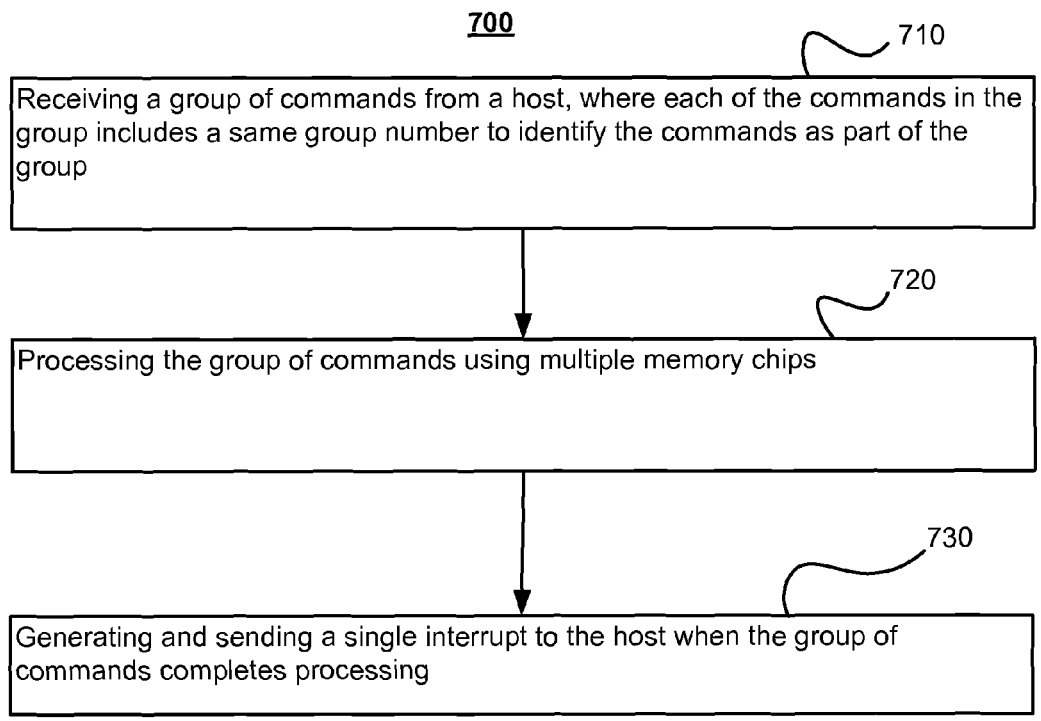
FIG. 7 is an exemplary flowchart illustrating a process for processing a group of commands on a data storage device.

Referring to FIG. 7, a process 700 is illustrated for processing a group of commands on a data storage device. Process 700 may include receiving a group of commands from a host, where each of the commands in the group includes a same group number to identify the commands as part of the group (710), processing the group of commands using multiple memory chips (720) and generating and sending a single interrupt to the host when the group of commands completes processing (703).

In one exemplary implementation, the controller 110 may be configured to perform the process 700. For instance, the controller 110 and its components may be configured to receive a group of commands from the host 106, where the host 106 assigns a same group number in the command header of each of the commands in the groups to identify the commands as part of the group (710). The command processor 122 may be configured to process the commands using the flash memory chips 118a and 118b (720). The command processor 122 may be configured to process the commands in a non-contiguous order using the flash memory chips 118a and 118b. The interrupt processor 124 may be configured to generate and send the single interrupt when the group of commands completes processing (730).

In one exemplary implementation, the controller 110 may be configured to receive multiple groups of commands from the host 106, where each of the different groups of commands is assigned a different group number. The driver 107 may be configured to track the group numbers that are assigned to the different groups of commands. The command processor 122 may be configured to process the multiple groups of commands. The interrupt processor 124 may be configured to generate and send a single interrupt for each of the different groups of commands when all of the commands in a particular group complete processing.

Figure 8:
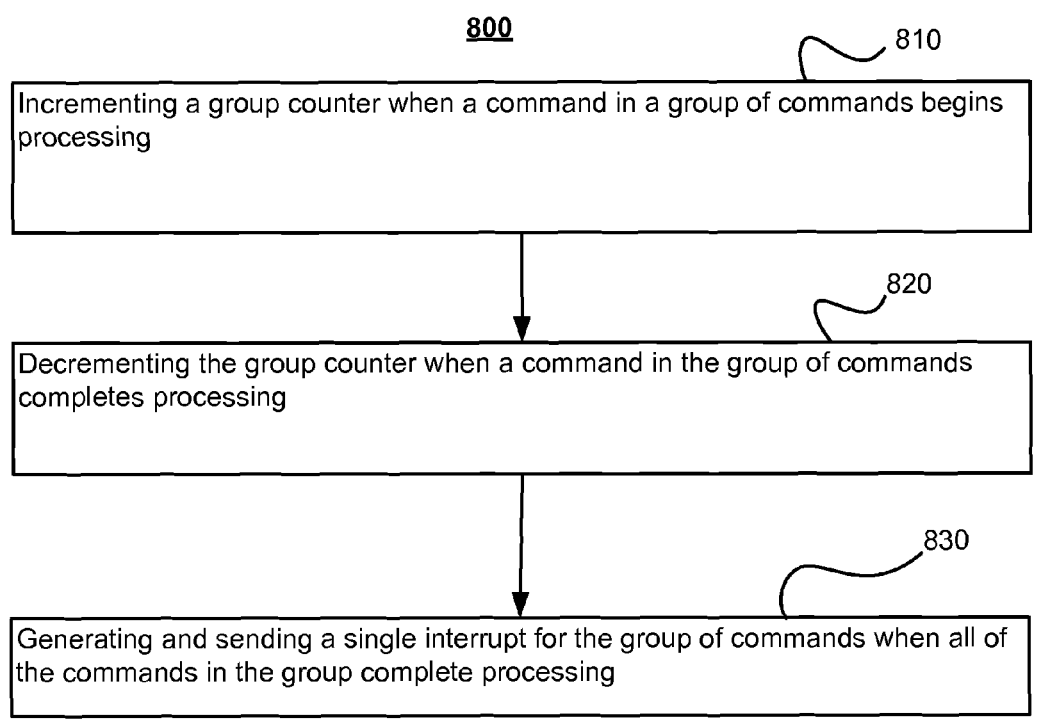
FIG. 8 is an exemplary flowchart illustrating a process for tracking commands in a controller.

Referring to FIG. 8, a process 800 is illustrated for tracking commands in a controller. Process 800 may include incrementing a group counter when a command in a group of commands begins processing (810), decrementing the group counter when a command in the group of commands completes processing (820) and generating and sending a single interrupt for the group of commands when all of the commands in the complete processing (830).

In one exemplary implementation, process 800 may be performed by the controller 110 and its components. For example, the interrupt processor 124 may be configured to increment a group counter 284 when a command in the group of commands begins processing (810). The interrupt processor 124 may be configured to decrement the group counter 284 when a command in the group of commands completes processing (820). The interrupt processor 124 may be configured to generate and send the single interrupt for the group of commands when all of the commands in the group complete processing (830). In one exemplary implementation, the interrupt processor 124 may generate and send the single interrupt command when a last command in the group of commands begins processing and the group counter is decremented to zero.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A data storage device, comprising:
multiple memory chips; and
a controller that is operably coupled to the memory chips and that is arranged and configured to:
receive multiple groups of commands from a host, wherein each group of commands is assigned a group number and each command in a specific group includes a same group number to identify the commands as part of the specific group,
process the groups of the commands using the memory chips, and generate and send a single interrupt to the host for each of the groups when each of the groups of the commands completes processing, wherein the controller is capable of maintaining an order of the commands within a same group designated for a same storage location and, at a same time, is capable of reordering and dispatching commands from different groups designated for different storage locations in a non-contiguous order.

2. The data storage device of claim 1 wherein each of the commands includes a command header and the command header includes the group number.

3. The data storage device of claim 1 wherein a last command in the group of the commands includes a flag in a command header to indicate the last command to the controller.

4. The data storage device of claim 1 wherein the group number identifies each of the commands as part of the group without using pointers in the commands to point to a next command in the group.

5. The data storage device of claim 1 wherein the controller comprises an interrupt processor that is arranged and configured to track the group of the commands as the commands are processed by the controller and to generate the single interrupt to send to the host when the group of the commands is completed processing.

6. The data storage device of claim 5 wherein the interrupt processor comprises multiple counters, wherein each of the counters is assigned to a different group of commands received by the controller.

7. The data storage device of claim 5 wherein the interrupt processor comprises multiple different interrupt mechanisms.

8. The data storage device of claim 7 wherein more than one interrupt mechanism is enabled at a same time.

9. The data storage device of claim 7 wherein the interrupt mechanisms include a watermark interrupt mechanism, a timeout interrupt mechanism and a group interrupt mechanism.

10. The data storage device of claim 1 wherein the memory chips are flash memory chips and the controller is a field programmable gate array (FPGA) controller.

11. The data storage device of claim 10 further comprising:
a memory board on which the flash memory chips are arranged and configured into multiple channels, with each of the channels being associated with one or more of the flash memory chips; and
a controller board that is operably connected to the memory board, wherein the controller board comprises:
a high speed interface; and
the controller that is arranged and configured to receive the commands from the host using the high speed interface.

12. A method for processing a group of commands on a data storage device having multiple memory chips, the method comprising:
receiving multiple groups of commands from a host, wherein each group of commands is assigned a group number and each command in a specific group includes a same group number to identify the commands as part of the specific group;
processing the groups of commands using multiple memory chips; and
generating and sending a single interrupt to the host for each of the groups when each of the groups of the commands completes processing, wherein processing the groups of commands includes maintaining an order of the commands within a same group designated for a same storage location and, at a same time, reordering and dispatching commands from different groups designated for different storage locations in a non-contiguous order.

13. An apparatus for tracking commands in a controller, the apparatus comprising:
multiple group counters, wherein each of the group counters is configured to track a group of commands being processed by a controller by incrementing when a command in the group begins processing by the controller and decrementing when a command in the group completes processing; and
interrupt send logic that is operably coupled to the group counters and that is arranged and configured to generate and send a single interrupt for each of the group counters when all of the commands in a group complete processing,
wherein the controller is capable of maintaining an order of the commands within a same group designated for a same storage location and, at a same time, is capable of reordering and dispatching commands from different groups designated for different storage locations in a non-contiguous order.

14. The apparatus of claim 13 wherein each of the commands in a same group is identified by a same group number.

15. The apparatus of claim 13 wherein the multiple group counters are configured to receive a signal to increment one of the group counters when a command being tracked by the group counter begins processing.

16. The apparatus of claim 13 wherein the multiple group counters are configured to receive a signal to decrement one of the group counters when a command being tracked by the group counter completes processing.

17. The apparatus of claim 13 wherein the interrupt send logic is configured to generate and send the single interrupt when a last command in a group begins processing and the group counter associated with the final command is decremented to zero.

18. A method for tracking commands in a controller, the method comprising:
incrementing a group counter when a command in a group of commands begins processing;
decrementing the group counter when a command in the group of commands completes processing;
generating and sending a single interrupt for the group of commands when all of the commands in the group complete processing; and
maintaining an order of the commands within a same group designated for a same storage location and, at a same time, reordering and dispatching commands from different groups designated for different storage locations in a non-contiguous order.

19. The method as in claim 18 wherein generating and sending the single interrupt comprises generating and sending the single interrupt when a last command in the group begins processing and the group counter is decremented to zero.

20. A system comprising:
a data storage device including a plurality of memory chips and multiple physical channels for communication of data between a host and the plurality of memory chips, each channel being operably connected to a different plurality of the memory chips; and
a host operably coupled to the data storage device using an interface, the host comprising a driver that is configured to:

send commands to the data storage device for processing by the data storage device using the plurality of memory chips, group the commands into one or more different groups and to assign a group number to each of the commands in a group, and mark a last command in a group, wherein the data storage device is capable of maintaining an order of the commands within a same group designated for a same storage location and, at a same time, is capable of reordering and dispatching commands from different groups designated for different storage locations in a non-contiguous order.

21. The system of claim 20 wherein the data storage device is configured to generate and send a single interrupt to the host after processing the commands in the group.

22. The system of claim 20 wherein the plurality of memory chips comprise flash memory chips.

23. The system of claim 20 wherein the driver is configured to track usage of group numbers.

24. The system of claim 20 where the host is configured to enable one or more interrupt mechanisms on the data storage device.

25. The system of claim 24 wherein the interrupt mechanisms include a watermark interrupt mechanism, a timeout interrupt mechanism and a group interrupt mechanism.

26. The method as in claim 12 wherein the memory chips are flash memory chips.

27. The method as in claim 12 wherein each of the commands includes a command header and the command header includes the group number inserted by the host.

28. The method as in claim 12 further comprising:
incrementing a group counter when a command in a group of commands begins processing; and
decrementing the group counter when a command in the group of commands completes processing.

29. The method as in claim 18 wherein the controller is a field programmable gate array (FPGA) controller.

30. The method as in claim 19 further comprising using a flag in the last command to indicate the last command in the group.

* * * * *